United States Patent
Feldstein et al.

(10) Patent No.: US 8,350,513 B2
(45) Date of Patent: Jan. 8, 2013

(54) METHOD FOR CONTROLLING A ROLLER SHADE USING A VARIABLE LINEAR VELOCITY

(75) Inventors: George Feldstein, Cresskill, NJ (US); Mark LaBosco, New City, NY (US)

(73) Assignee: Crestron Electronics Inc., Rockleigh, NJ (US)

( * ) Notice: Subject to any disclaimer, the term of this patent is extended or adjusted under 35 U.S.C. 154(b) by 182 days.

(21) Appl. No.: 12/872,267

(22) Filed: Aug. 31, 2010

(65) Prior Publication Data

US 2012/0053729 A1   Mar. 1, 2012

Related U.S. Application Data

(63) Continuation of application No. 12/871,516, filed on Aug. 30, 2010.

(51) Int. Cl.
    *H02P 7/00*   (2006.01)
(52) U.S. Cl. ........ 318/466; 318/256; 318/266; 318/280; 318/468
(58) Field of Classification Search ................. 318/466, 318/610, 626, 400.4, 468, 255, 256, 265, 318/266, 280, 282, 467; 160/7, 84.02, 238, 160/293; 700/42, 63, 64
    See application file for complete search history.

(56) References Cited

U.S. PATENT DOCUMENTS

| | | | | |
|---|---|---|---|---|
| 5,467,266 A * | 11/1995 | Jacobs et al. | ..................... | 700/56 |
| 5,710,496 A * | 1/1998 | Boom | .......................... | 318/610 |
| 5,848,634 A * | 12/1998 | Will et al. | ..................... | 160/310 |
| 6,100,659 A * | 8/2000 | Will et al. | ..................... | 318/466 |
| 6,497,267 B1 * | 12/2002 | Azar et al. | ..................... | 160/310 |
| 7,281,656 B2 | 10/2007 | Carmen, Jr. et al. | | |
| 7,346,272 B2 * | 3/2008 | Franzan | ......................... | 388/800 |
| 7,445,035 B2 * | 11/2008 | Bruno et al. | ................... | 160/310 |
| 7,537,040 B2 | 5/2009 | Carmen, Jr. et al. | | |
| 7,635,018 B2 * | 12/2009 | Carmen et al. | ................ | 160/310 |
| 2003/0227271 A1 * | 12/2003 | Shindo | .......................... | 318/439 |
| 2006/0087271 A1 * | 4/2006 | Walker | .......................... | 318/449 |

OTHER PUBLICATIONS

USPTO Form 892 from copending U.S. Appl. No. 12/912,308.
Office Action dated May 3, 2012 and USPTO Form 892 from copending U.S. Appl. No. 12/871,516.
Office Action dated Jun. 18, 2012 and USPTO Form 892 from copending U.S. Appl. No. 12/912,308.
Office Action dated Jun. 18, 2012 and USPTO Form 892 from copending U.S. Appl. No. 12/912,326.
Office Action dated Aug. 27, 2012 and USPTO Form 892 from copending U.S. Appl. No. 12/871,516.

* cited by examiner

*Primary Examiner* — Walter Benson
*Assistant Examiner* — Thai Dinh
(74) *Attorney, Agent, or Firm* — Creston Electronics Inc.

(57) ABSTRACT

Presented is a method for controlling a roller shade having a roller tube windingly receiving a flexible shade material. The method includes providing a motor that rotates the roller tube to move the flexible shade material between a first position and a second position. The method further includes capturing, with an optical sensor, an image frame at a plurality of linear positions along the flexible shade material as the flexible shade material moves from the first position to the second position. The method further includes controlling the reversible motor to move the flexible shade material from the first position to the second position in response to position information obtained from the captured image frames using a variable linear velocity profile so that the flexible shade material moves from the first position to the second position at a variable linear velocity.

19 Claims, 20 Drawing Sheets

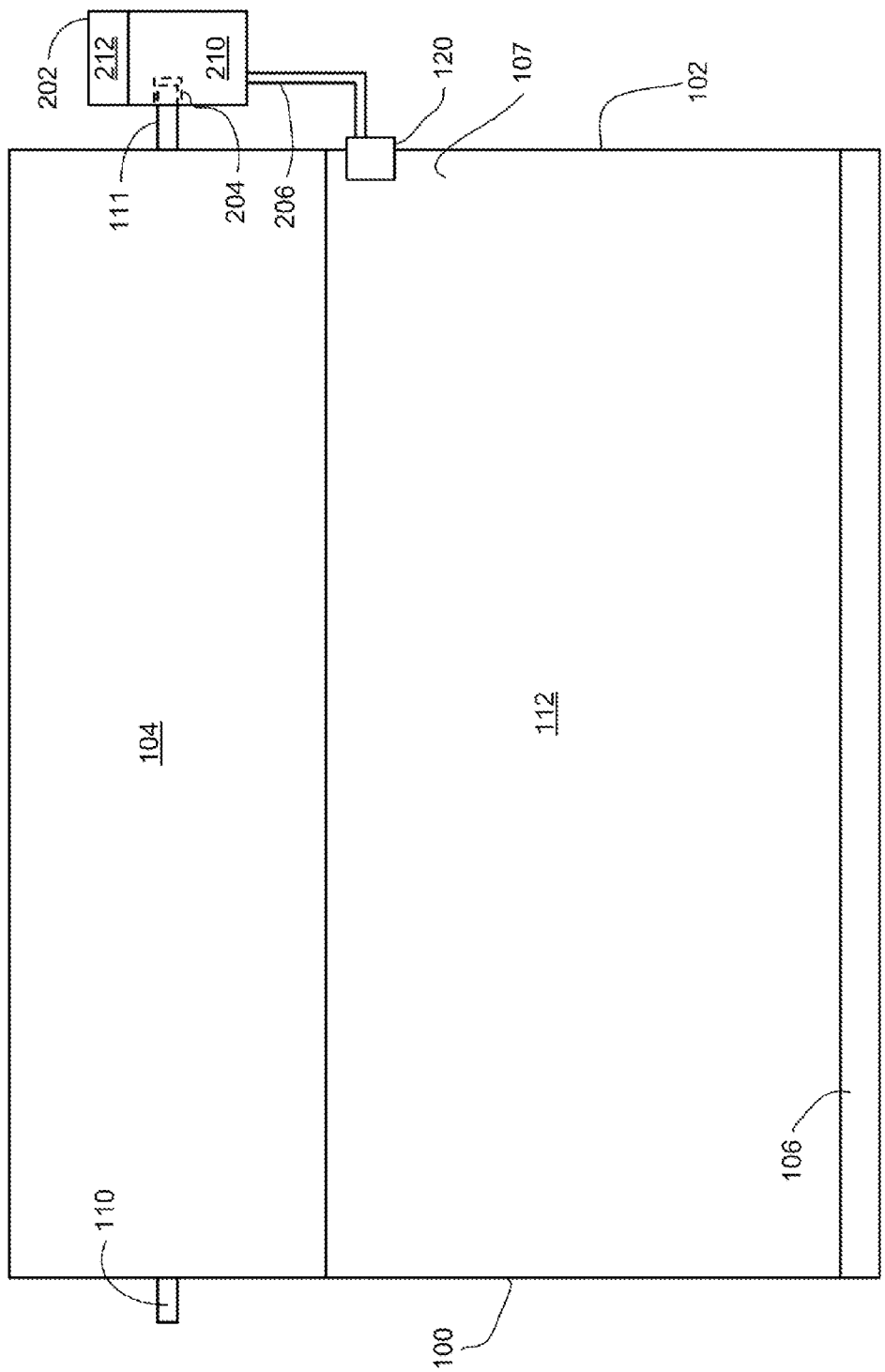

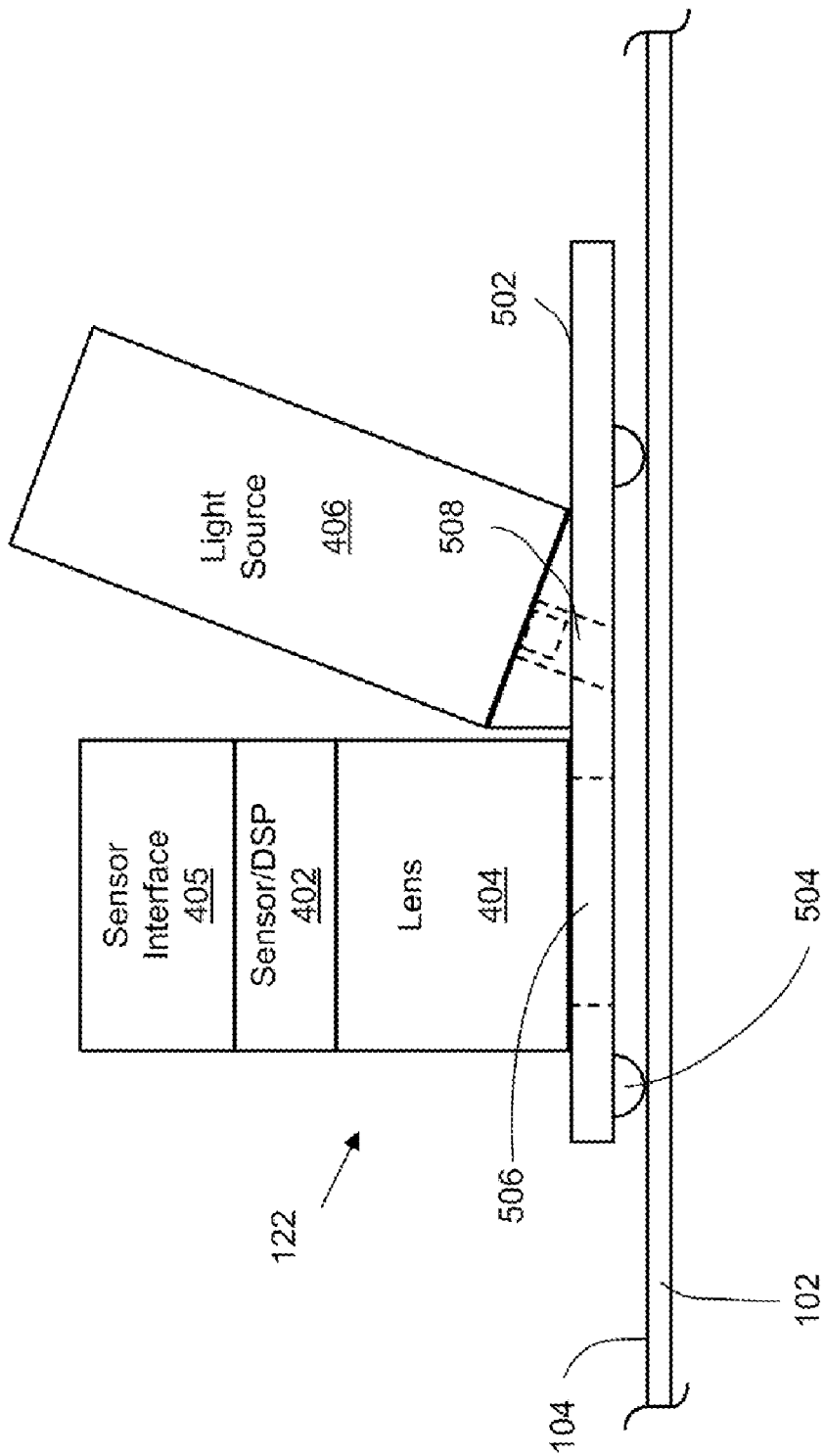

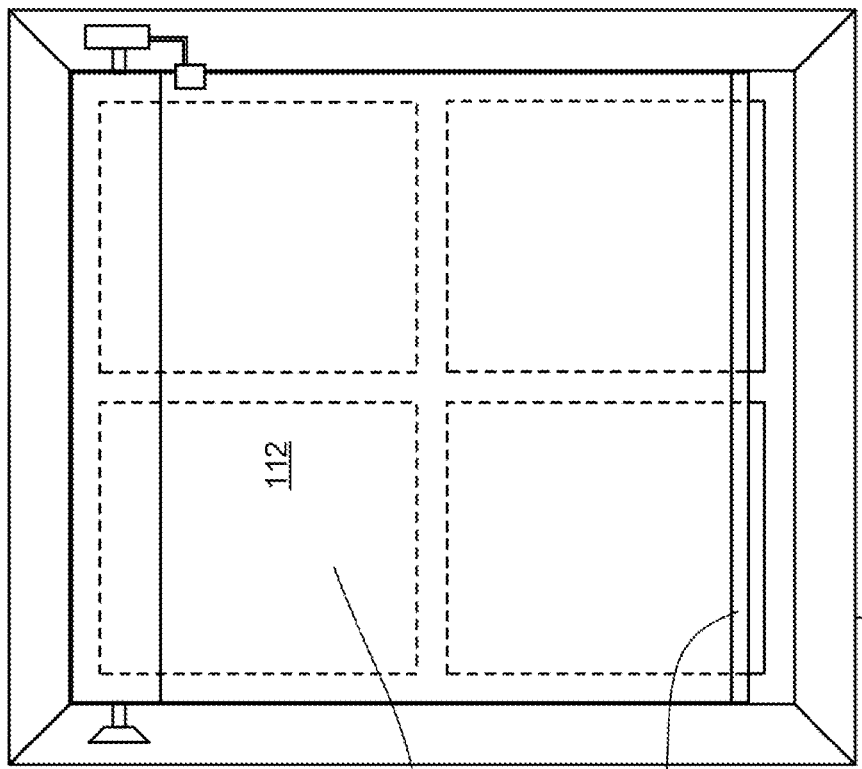
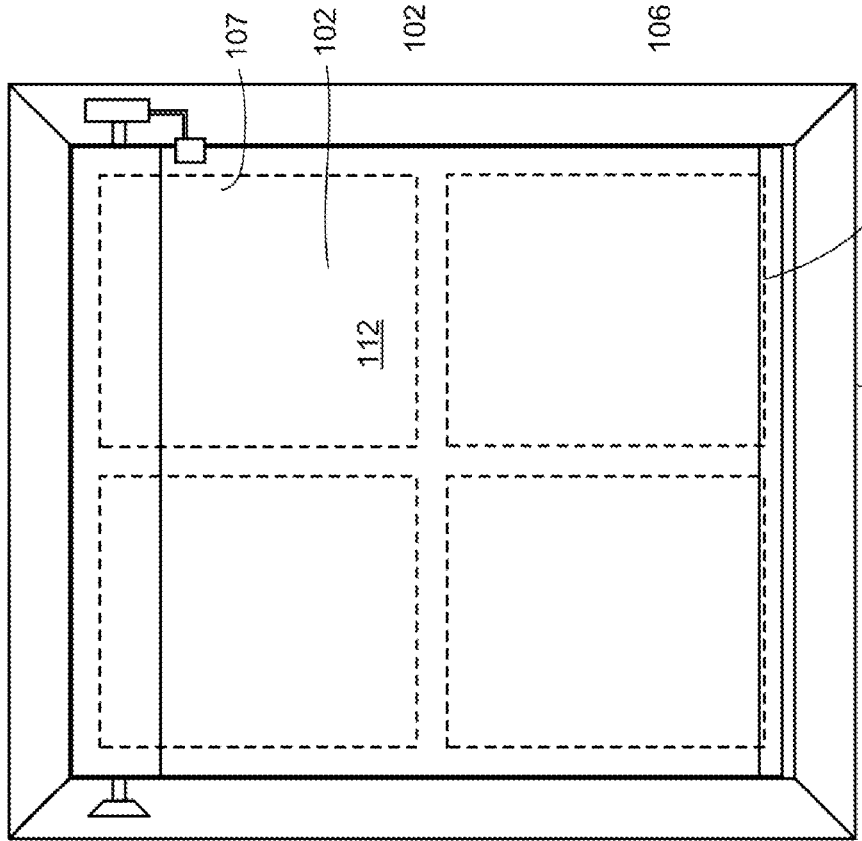
Fig. 8B
Fig. 8A

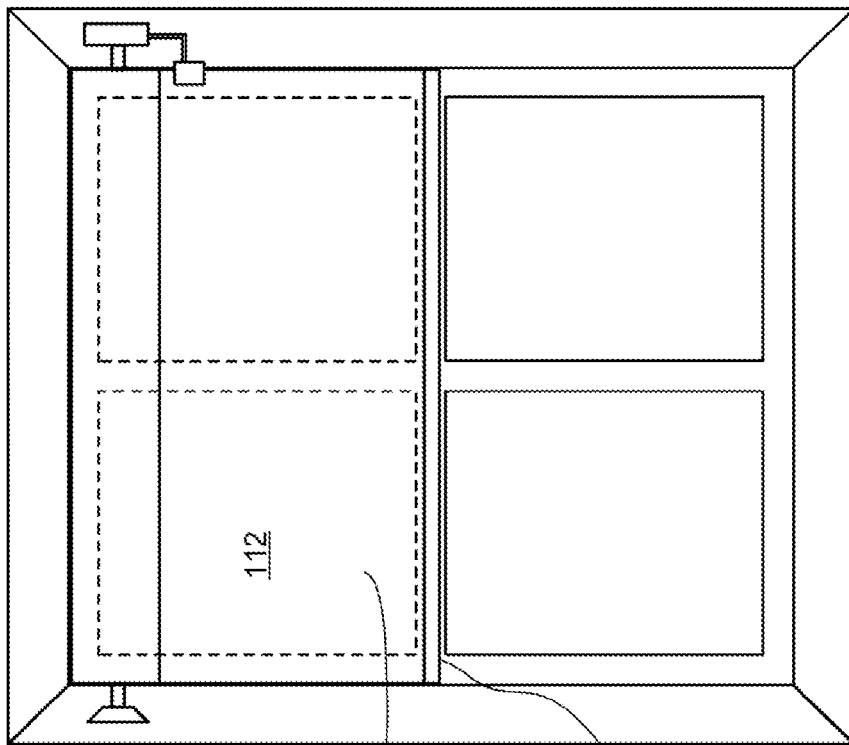
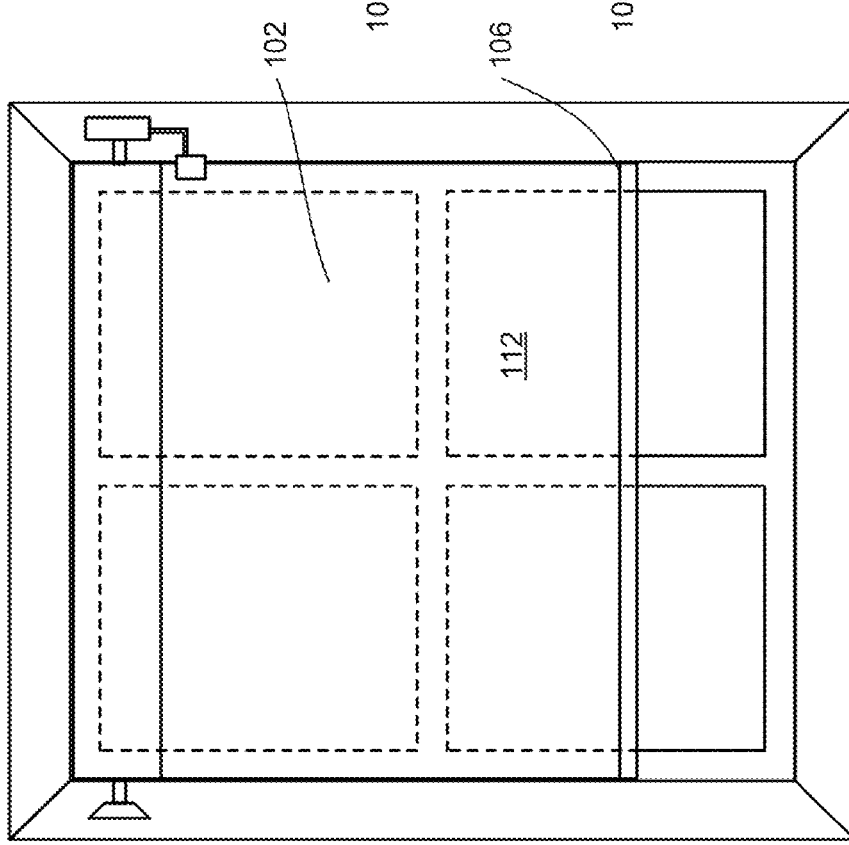

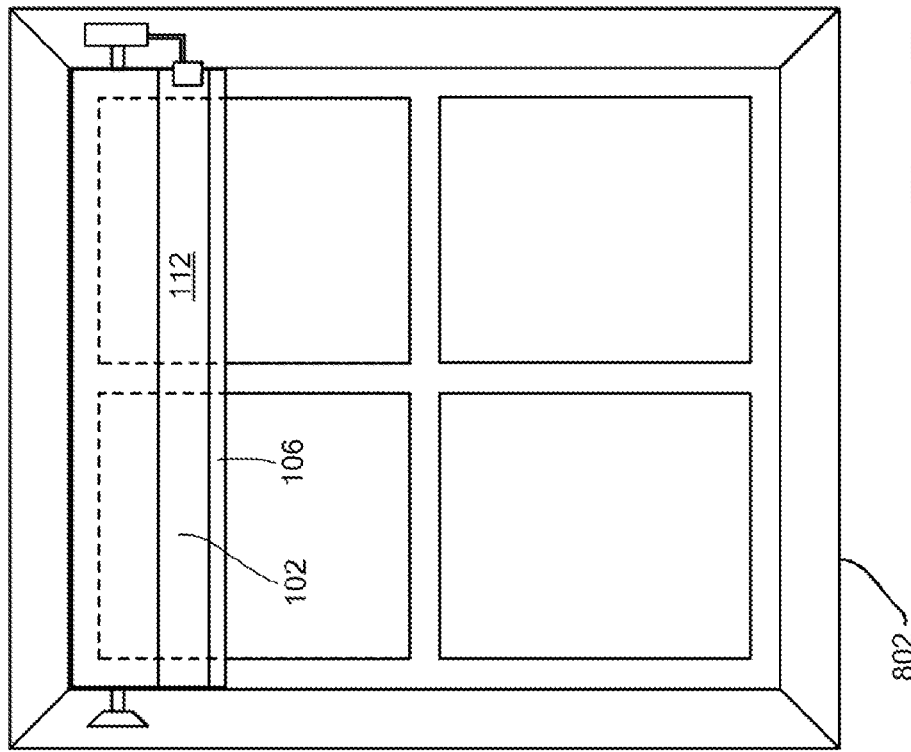
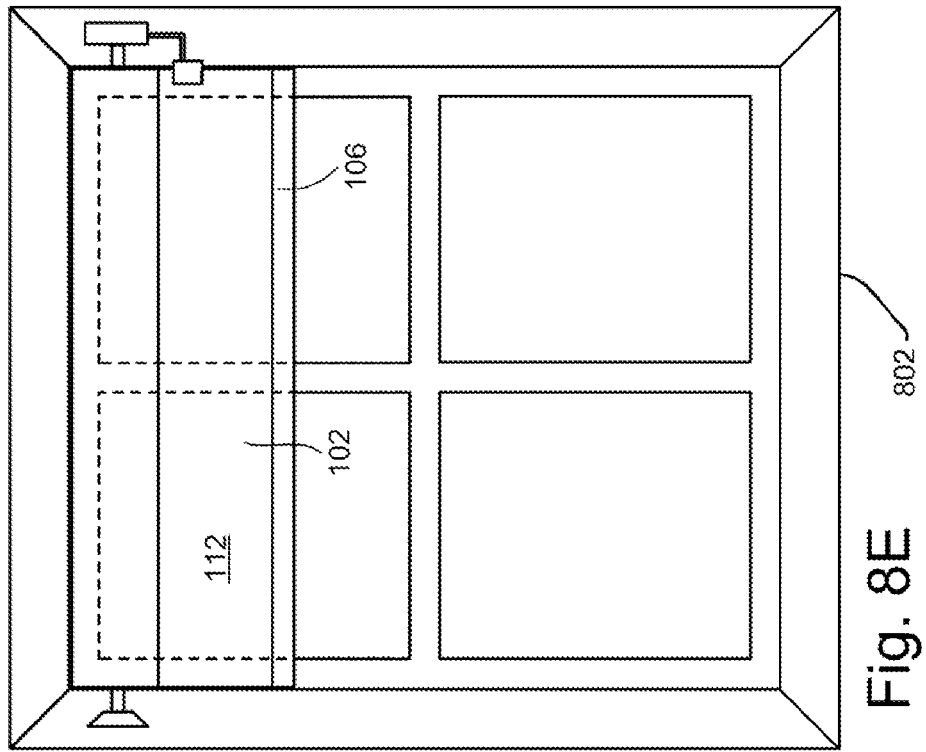

METHOD FOR CONTROLLING A ROLLER SHADE USING A VARIABLE LINEAR VELOCITY

BACKGROUND OF THE INVENTION

1. Technical Field

The present invention generally relates to raising and lowering roller shades, and more particularly to raising and lowering roller shades to a selected position using variable linear shade velocities to prevent overshooting or undershooting the selected shade position.

2. Background Art

A typical motorized roller shade includes a flexible shade fabric wound onto an elongated roller tube. The roller tube is rotatably supported so that a lower end of the flexible shade fabric can be raised (i.e., wound) or lowered (i.e., unwound) by rotating the roller tube. The roller tube is rotated by a motorized drive system.

A common problem with typical motorized roller shades is that when the shade is raised or lowered, the motorized drive system, which moves the shade at a constant velocity, abruptly starts rotating the roller tube, winds or unwinds the shade at the constant velocity, and then abruptly stops rotating the roller tube when the shade reaches a selected position. Consequently, during raising or lowering of the shade, the shade moves with an aesthetically unpleasing "jerky" motion. Further, sometimes the shade undershoots the selected position because the shade is abruptly stopped too early. Other times, the shade overshoots the selected position because the shade is abruptly stopped to late, or because the shade's momentum carries it past the selected position.

Attempts to position correctly a roller shade have included counting the rotations of the shade motor while the shade moves at a constant linear velocity. The linear velocity of a roller shade is typically estimated by determining the rotations per minute (RPMs) of the shade motor and multiplying the RPMs by the estimated changing distance between the last outer layer of fabric rolled on the shade tube and the tube center as the shade fabric is rolled or unrolled. This indirect method of determining linear velocity does not account for variations in shade fabric thickness and the random gaps that develop between the layers of the shade fabric. The accuracy of the positioning of the shade is limited by the accuracy of the motor rotational position measurement.

Therefore, a need exists for a motorized roller shade that starts and stops smoothly while not undershooting or overshooting the selected shade position. Additionally, a need also exists for a motorized roller shade that allows each of a plurality of shades to raise or lower at varying velocity so that each of the plurality of shades arrives at the desired position at the same time.

SUMMARY OF THE INVENTION

It is to be understood that both the general and detailed descriptions that follow are exemplary and explanatory only and are not restrictive of the invention

DISCLOSURE OF THE INVENTION

According to one aspect, the invention involves a method for controlling a roller shade having a rotatably supported roller tube windingly receiving a flexible shade material. The method includes providing a reversible motor that operably engages the roller tube to rotate the roller tube to move a lower end of the flexible shade material between a first position and a second position, capturing, with an optical sensor, an image frame of the flexible shade material at a plurality of linear positions along the flexible shade material as the lower end of the flexible shade material moves from the first position to the second position, and controlling the reversible motor to move the lower end of the flexible shade material from the first position to the second position in response to position information obtained from the plurality of captured image frames.

In one embodiment, the method further includes processing the plurality of captured image frames with a digital signal processor to determine the position information comprising changes in position of the flexible shade material as the lower end of the flexible shade material moves from the first position to the second position.

In another embodiment, the method further includes controlling the reversible motor to move the lower end of the flexible shade material from the first position to the second position in a predetermined amount of time.

In yet another embodiment, the method further includes controlling the reversible motor to move the lower end of the flexible shade material from the first position to the second position using a proportional integral derivative (PID) loop.

In still another embodiment, the method further includes controlling the reversible motor to move the lower end of the flexible shade material from the first position to the second position using a variable linear velocity profile so that the lower end of the of the flexible shade material moves from the first position to the second position at a variable linear velocity. The variable linear velocity profile is one of an exponential function, a ramp function, or a Gaussian function.

In another embodiment, the method further includes illuminating the flexible shade material moving past the optical sensor with a light source. The light source includes one of an incandescent light, a light emitting diode, or a vertical cavity surface emitting laser. The optical sensor includes one of a high speed digital camera, a charge coupled device, or a complementary metal oxide semiconductor detector.

In still another embodiment, the method further includes storing in a memory the positions of the lower end of the flexible shade material when the roller shade is fully open and when the roller shade is fully closed.

In another aspect, the invention involves a method for controlling a roller shade having a rotatably supported roller tube windingly receiving a flexible shade material. The method includes providing a reversible motor that operably engages the roller tube to rotate the roller tube to move a lower end of the flexible shade material between a first position and a second position, and controlling the reversible motor to move the lower end of the flexible shade material from the first position to the second position using a variable linear velocity profile so that the lower end of the of the flexible shade material moves from the first position to the second position at a variable linear velocity. In one embodiment, variable linear velocity profile is one of an exponential function, a ramp function, or a Gaussian function In one embodiment, the method further includes capturing, with an optical sensor, an image frame of the flexible shade material at a plurality of linear positions along the flexible shade material as the lower end of the flexible shade material moves from the first position to the second position.

In another embodiment, the method further includes processing the plurality of captured images frames with a digital signal processor to determine changes in position of the flexible shade material as the lower end of the flexible shade material moves from the first position to the second position.

In still another embodiment, the method further includes controlling the reversible motor to move the lower end of the flexible shade material from the first position to the second position in response to the changes in position of the flexible shade material.

In yet another embodiment, the method further includes controlling the reversible motor to move the lower end of the flexible shade material from the first position to the second position in a predetermined amount of time.

In another embodiment, the method further includes controlling the reversible motor to move the lower end of the flexible shade material from the first position to the second position using a proportional integral derivative (PID) loop.

In still another embodiment, the method further includes illuminating the flexible shade material moving past the optical sensor with a light source. The light source includes one of an incandescent light, a light emitting diode, or a vertical cavity surface emitting laser, and the optical sensor comprises one of a high speed digital camera, a charge coupled device, or a complementary metal oxide semiconductor detector.

In yet another embodiment, the method further includes storing in a memory the positions of the lower end of the flexible shade material when the roller shade is fully open and when the roller shade is fully closed.

In still another aspect, the invention involves a method for controlling a roller shade having a rotatably supported roller tube windingly receiving a flexible shade material. The method includes providing a reversible motor that operably engages the roller tube to rotate the roller tube to move a lower end of the flexible shade material between a first position and a second position, capturing, with an optical sensor, an image frame of the flexible shade material at a plurality of linear positions along the flexible shade material as the lower end of the flexible shade material moves from the first position to the second position, and controlling the reversible motor to move the lower end of the flexible shade material from the first position to the second position in response to position information obtained from the plurality of captured image frames using a variable linear velocity profile so that the lower end of the of the flexible shade material moves from the first position to the second position at a variable linear velocity.

BRIEF DESCRIPTION OF DRAWINGS

The accompanying figures further illustrate the present invention.

The components in the drawings are not necessarily drawn to scale, emphasis instead being placed upon clearly illustrating the principles of the present invention. In the drawings, like reference numerals designate corresponding parts throughout the several views.

FIG. 2A is an illustrative front view of the roller shade and sensor assembly of FIG. 1A coupled to a motor assembly.

FIG. 5A is an illustrative side view of a sensor assembly used for measuring the linear motion of a roller shade, according to another embodiment of the invention.

FIGS. 8A-8F are illustrative front views the roller shade and sensor assembly of FIG. 2A mounted in a window frame, with the end portion of the roller shade disposed in various vertical positions between a fully open and a fully closed position.

LIST OF REFERENCE NUMBERS FOR THE MAJOR ELEMENTS IN THE DRAWING

Figure 1A:
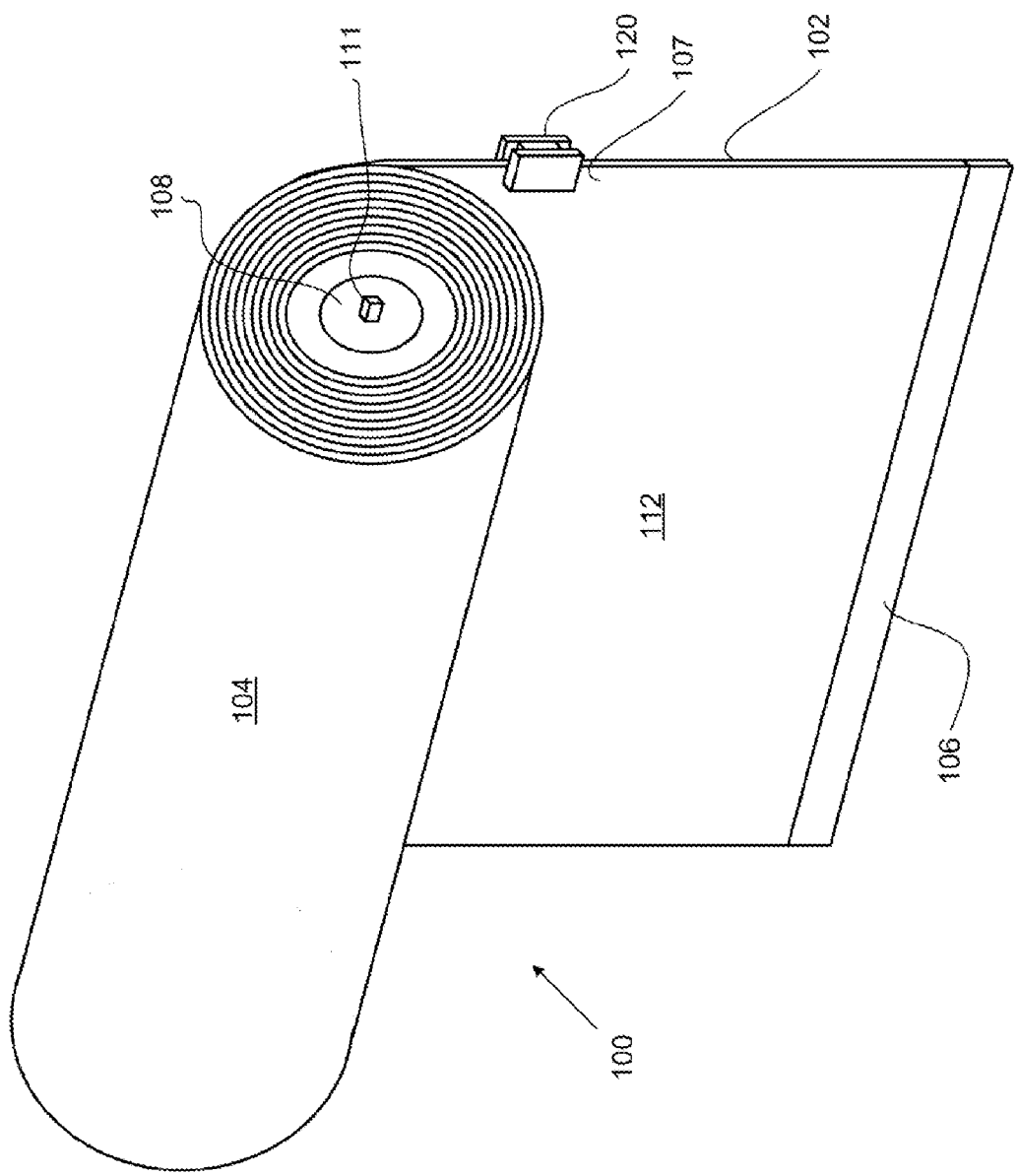
FIG. 1A is an illustrative perspective view of a roller shade and a sensor assembly, according to one embodiment of the invention.

The following is a list of the major elements in the drawings in numerical order.
100 roller shade
102 flexible shade material
104 rolled portion
106 lower end
107 upper end
108 roller tube
110 first pin
111 second pin
112 linear portion
120 sensor assembly
122 sensor assembly
202 motor assembly
204 socket
206 bracket
208 bracket
210 motor
212 motor controller
214 hinge/pivot pin
216 hinge/pivot pin
300 window
302 glass portion
304 frame
306 window box
308 right vertical side
310 mounting member
312 left vertical side 316 socket
402 sensor/DSP
404 lens
405 senor interface
406 light source
410 first plate
412 third plate
414 second plate
416 roller assembly
420 lens opening
422 light source opening
424 housing
425 sensor interface opening
426 wheel
428 strut
430 wheel axle
432 channel
434 spring
502 plate
504 ball
506 lens opening
508 light source opening
510 housing
511 sensor interface opening
512 socket
600 sensor assembly
602 plate
604 lens opening
606 light source opening
608 reduced friction material layer
702 microcontroller
704 bridge driver circuit
706 memory
708 controller interface
802 window
902 unwind flexible shade material
904 record position of the lower end of the flexible shade material
906 wind flexible shade material
908 record position of the lower end of the flexible shade material
910 store length of shade material in memory
1002 input desired shade position
1004 retrieve distance and time information from memory
1006 start ramp-up algorithm, position PID loop, and time PID loop
1008 start moving shade according to ramp-up algorithm
1010 capture and process images of the moving flexible shade material to determine position information
1012 update PID loops with position information
1014 move shade according to position and time PID loops
1016 adjust linear velocity of the shade based on position information
1018 start reducing linear velocity of the shade in response to reaching a particular max linear velocity and position
1020 reduce linear velocity of the shade to zero as shade reaches the desired position

DETAILED DESCRIPTION OF THE INVENTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

MODE(S) FOR CARRYING OUT THE INVENTION

The present invention involves a system and a method for smoothly (i.e., non-abruptly) raising and lowering one or more roller shades to selected positions using variable linear shade velocities to prevent overshooting or undershooting the selected position.

The disclosed system includes an optical sensor assembly that is used to measure directly the motion of the roller shade (i.e., distance moved). Shade position information from the optical sensor assembly is communicated to a shade controller that moves the shade to a selected position using a variable linear shade velocity.

Referring to FIG. 1A and FIG. 2A, in one embodiment, illustrative perspective and front views of a roller shade system are shown. The roller shade system includes a roller shade 100, a sensor assembly 120, and a motor assembly 202.

The roller shade 100 includes a flexible shade material 102 and a roller tube 108. A rolled portion 104 of the flexible shade material 102 is wound around the roller tube 108. A linear portion 112 of the flexible shade material 102 hangs from the rolled portion 104 of the flexible shade material 102 and includes a lower end 106 and an upper end 107. The roller tube 108 includes a first pin 110 disposed on one end of the roller tube 108, and a second pin 111 disposed on the other end of the roller tube 108. The first pin 110 has a circular cross-section, and the second pin 111 has a non-circular cross-section. The cross-section of the second pin 111 may be square, rectangular, triangular, hexagonal, or octagonal, for example.

The motor assembly 202 includes a motor 210 and a motor controller 212. The motor 210 includes a socket 204 configured to engage the second pin 111 and, when activated, rotate the roller tube 108 to wind or unwind the flexible shade material 102.

As shown in FIGS. 1A and 2A, the sensor assembly 120 is disposed proximate to the linear portion 112 of flexible shade material 102. The sensor assembly 120 is held in place by a bracket 206 coupled to the motor assembly 202.

Figure 1B:
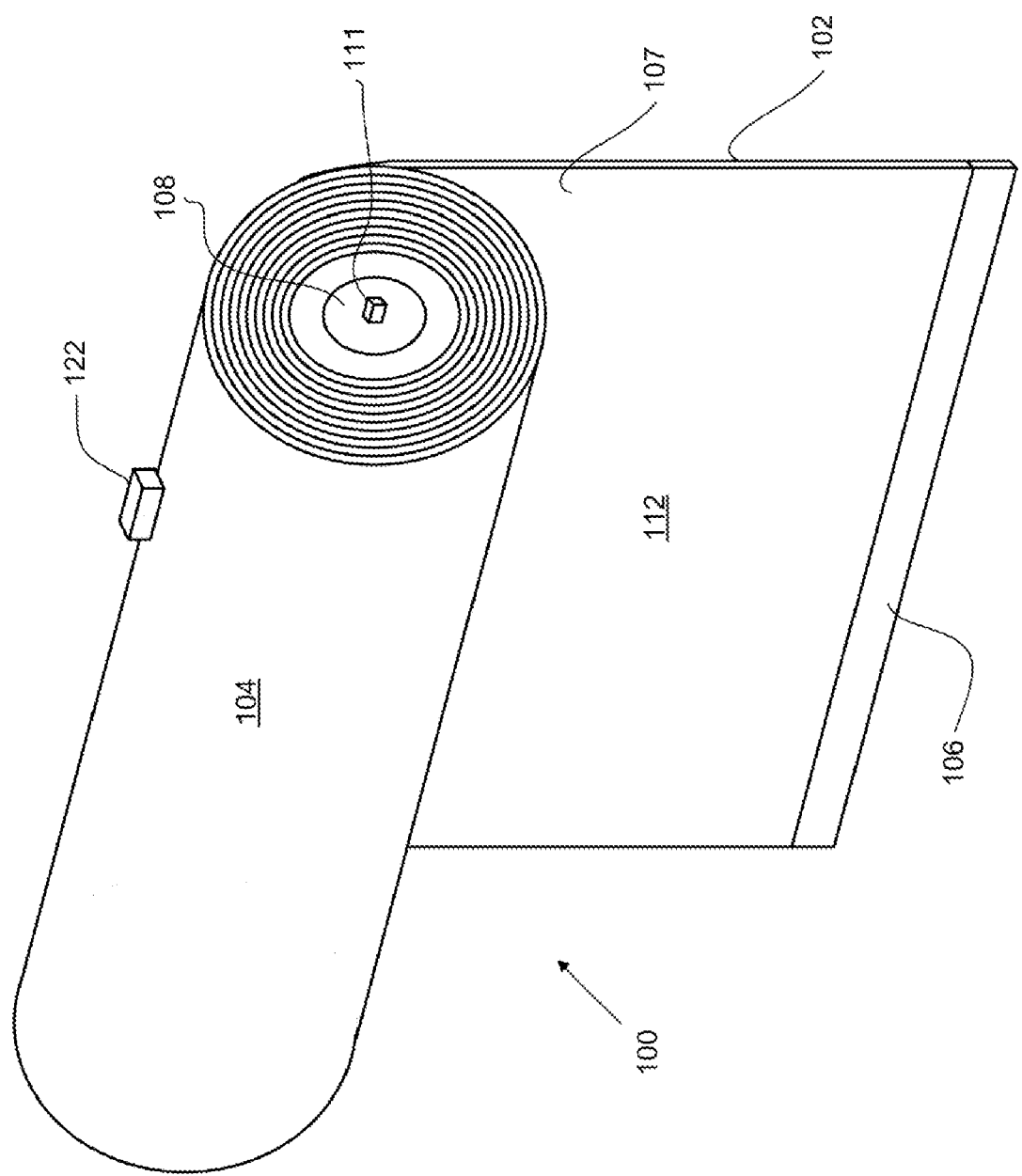
FIG. 1B is an illustrative perspective view of a roller shade and a sensor assembly, according to another embodiment of the invention.
Figure 2B:
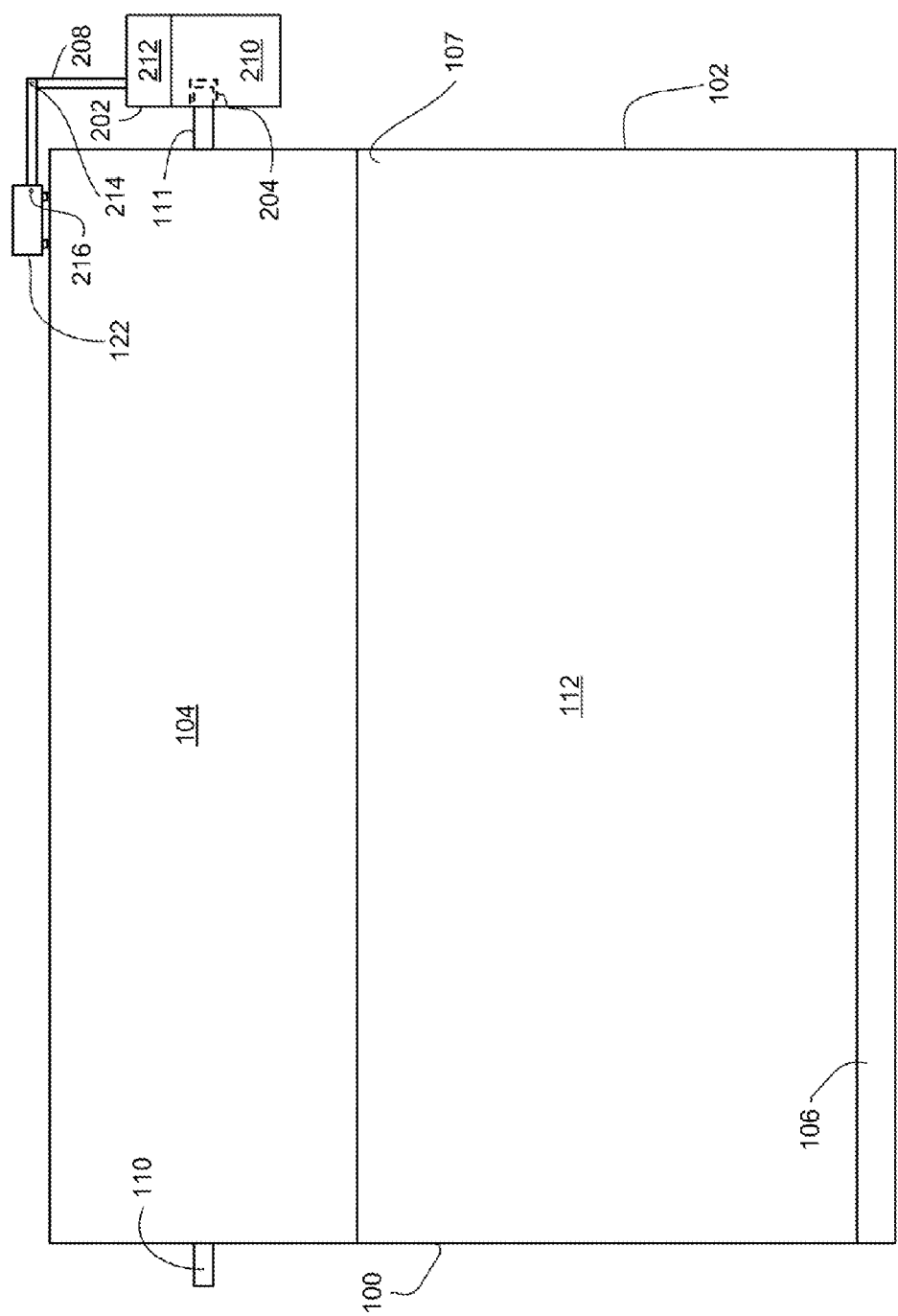
FIG. 2B is an illustrative front view of the roller shade and sensor assembly of FIG. 1B coupled to a motor assembly.

Referring to FIG. 1B and FIG. 2B, in another embodiment, the roller shade system includes a sensor assembly 122 in place of sensor assembly 120. The sensor assembly 122 is disposed proximate to the rolled portion 104 of the flexible shade material 102. The sensor assembly 122 is held in place by a bracket 208 coupled to the motor assembly 202, and held against the flexible shade material 102 by gravity.

The bracket 208 includes a hinge/pivot pin 214 and a hinge/pivot pin 216 (coupled to the sensor assembly 122). The bracket 208 and hinge/pivot pins 214, 216 enable the sensor assembly 122 to sit on the rolled portion 104 and lift or drop as the rolled portion 104 becomes thicker or thinner, as the flexible shade material 102 winds or unwinds from the roller tube 108.

Figure 3A:
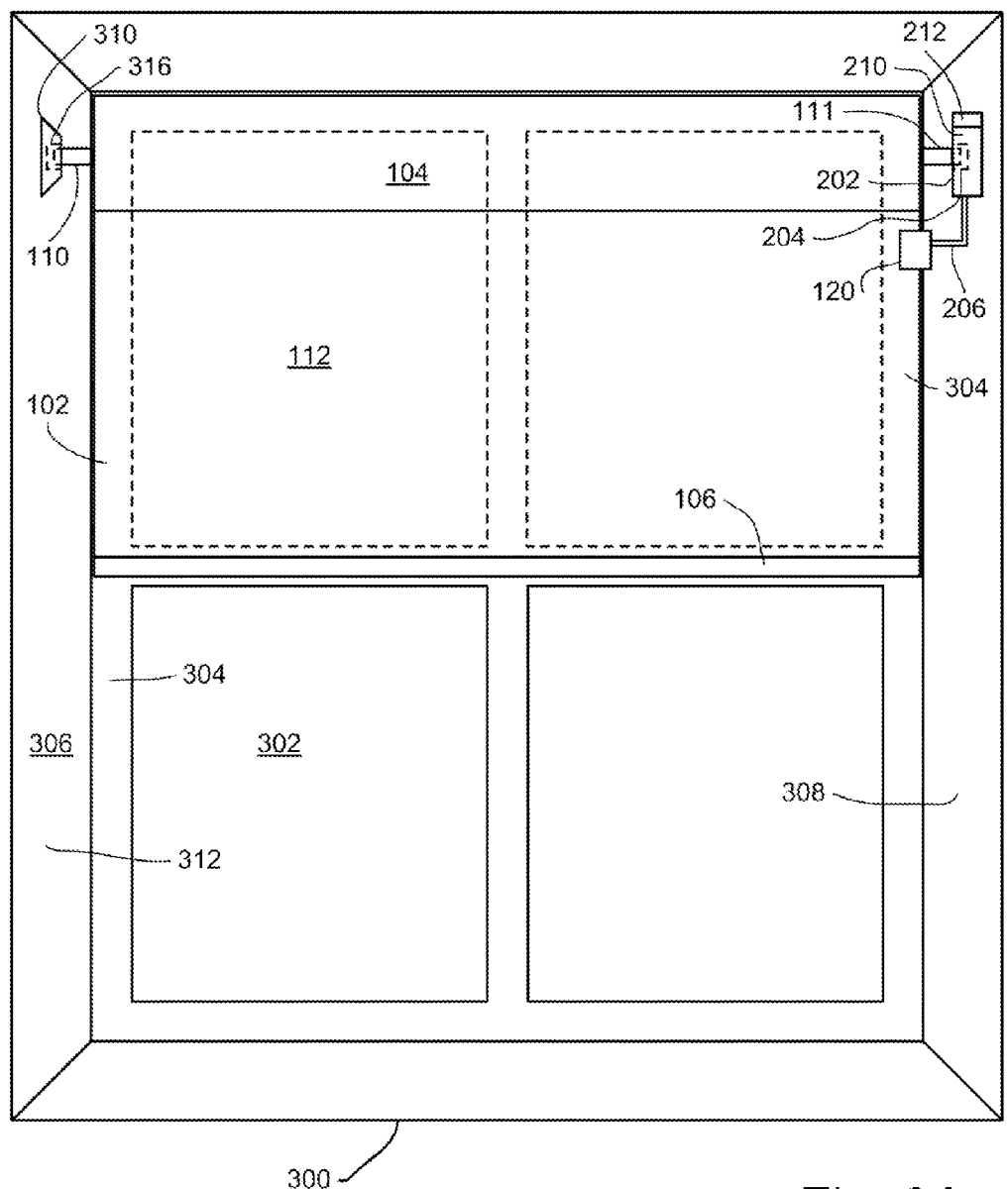
FIG. 3A is an illustrative front view the roller shade and sensor assembly of FIG. 2A mounted in a window frame, according to one embodiment of the invention.

Referring to FIG. 3A, in one embodiment, an illustrative diagram of a roller shade system mounted over a window 300 is shown. The window 300 includes a glass portion 302 held in a frame 304 that is disposed in a window box 306. The motor assembly 202 is mounted on a right vertical side 308 of the window box 306 and a mounting member 310 is mounted on a left vertical side 312 of the window box 306. The first pin 110 engages a socket 316 in the mounting member 310. The second pin 111 engages the socket 204 of the motor assembly 202. Thus, the roller tube 108 is supported by the motor assembly 202 and the mounting member 310, and may be rotated by the motor 210 to wind or unwind the flexible material 102. In this embodiment (as in FIG. 2A), the sensor assembly 120 is held in place by a bracket 206 coupled to the motor assembly 202.

In another embodiment, the sensor assembly 120 is held in place by a bracket coupled to a non-rotating portion of the roller tube 108. In yet another embodiment, the sensor assembly 120 is mounted to the window frame 304, to the right vertical side 308, or to the left vertical side 312 of the window box 306. In still another embodiment, the sensor assembly 120 is held in place by a bracket coupled to the mounting member 310.

Figure 3B:
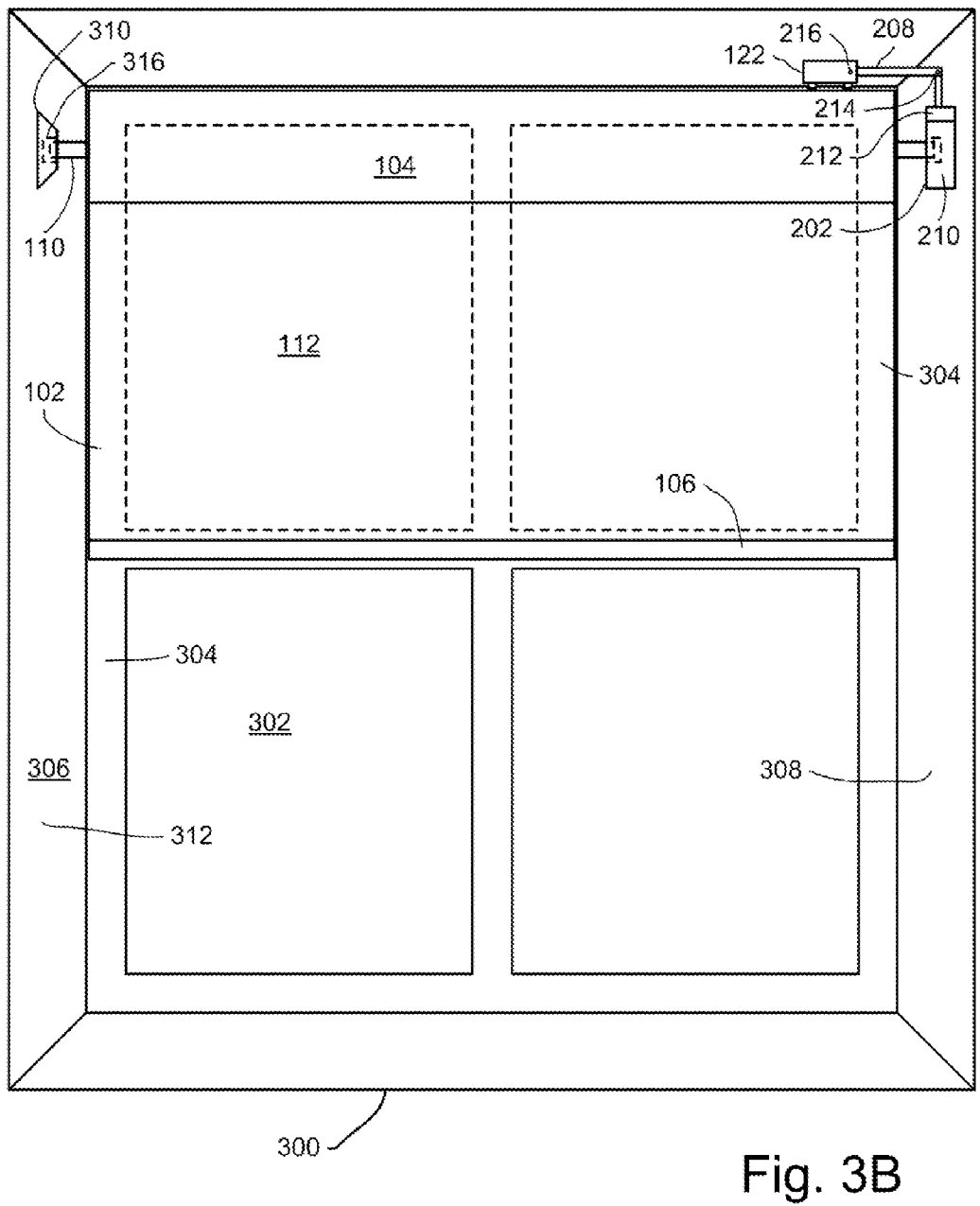
FIG. 3B is an illustrative front view the roller shade and sensor assembly of FIG. 2B mounted in a window frame, according to another embodiment of the invention.

Referring to FIG. 3B, in another embodiment (as in FIG. 2B), the sensor assembly 122 is held in place by a bracket 208 coupled to the motor assembly 202. In other embodiments, the sensor assembly 122 is held in place by a bracket coupled to a non-rotating portion of the roller tube 108, or to the mounting member 310. In still other embodiments, the sensor assembly 122 can be held against the rolled portion 104 anywhere along the circumference of the rolled portion 104 using a hinged/pivoting bracket tensioned with a spring.

Figure 4A:
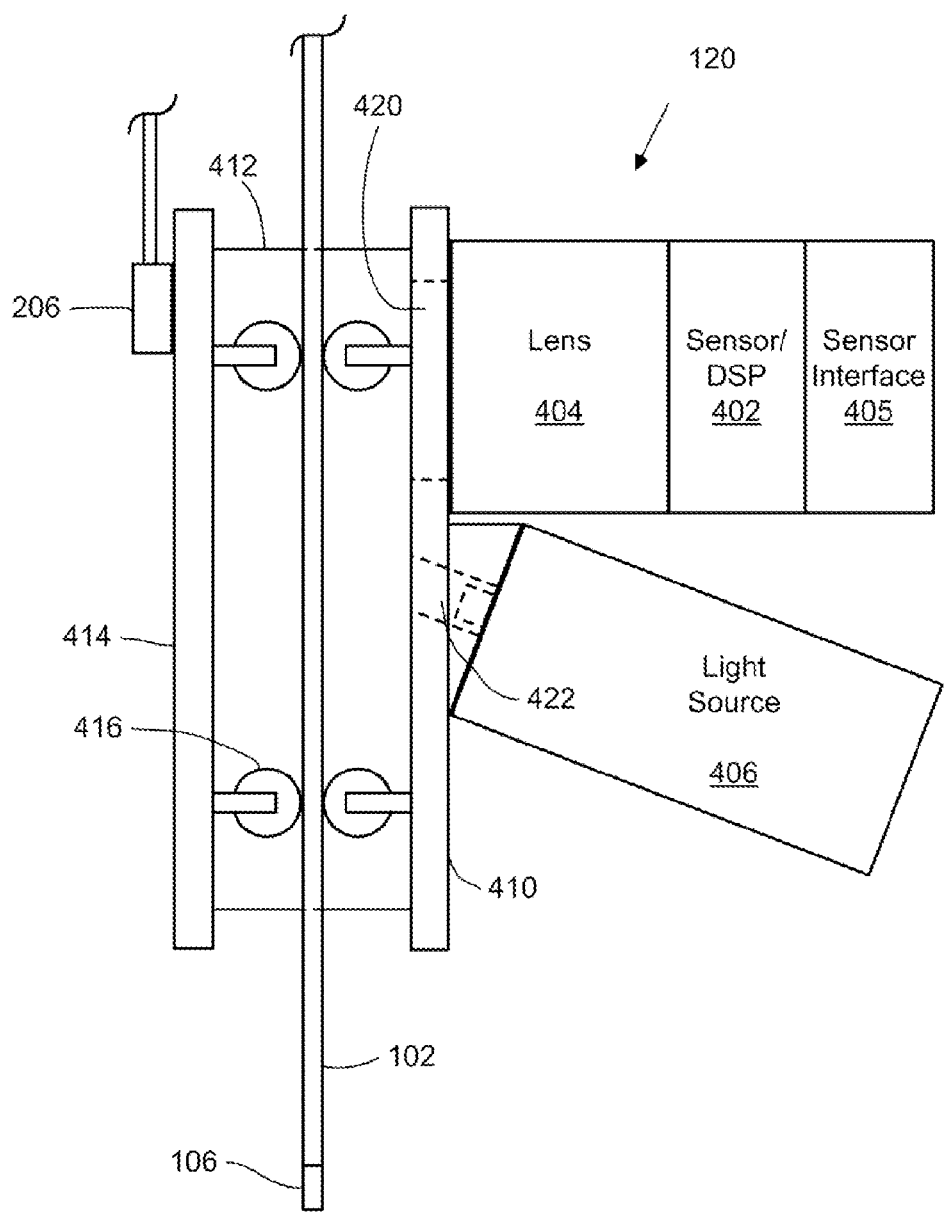
FIG. 4A is an illustrative side view of a sensor assembly used for measuring the linear motion of a roller shade, according to one embodiment of the invention.
Figure 4B:
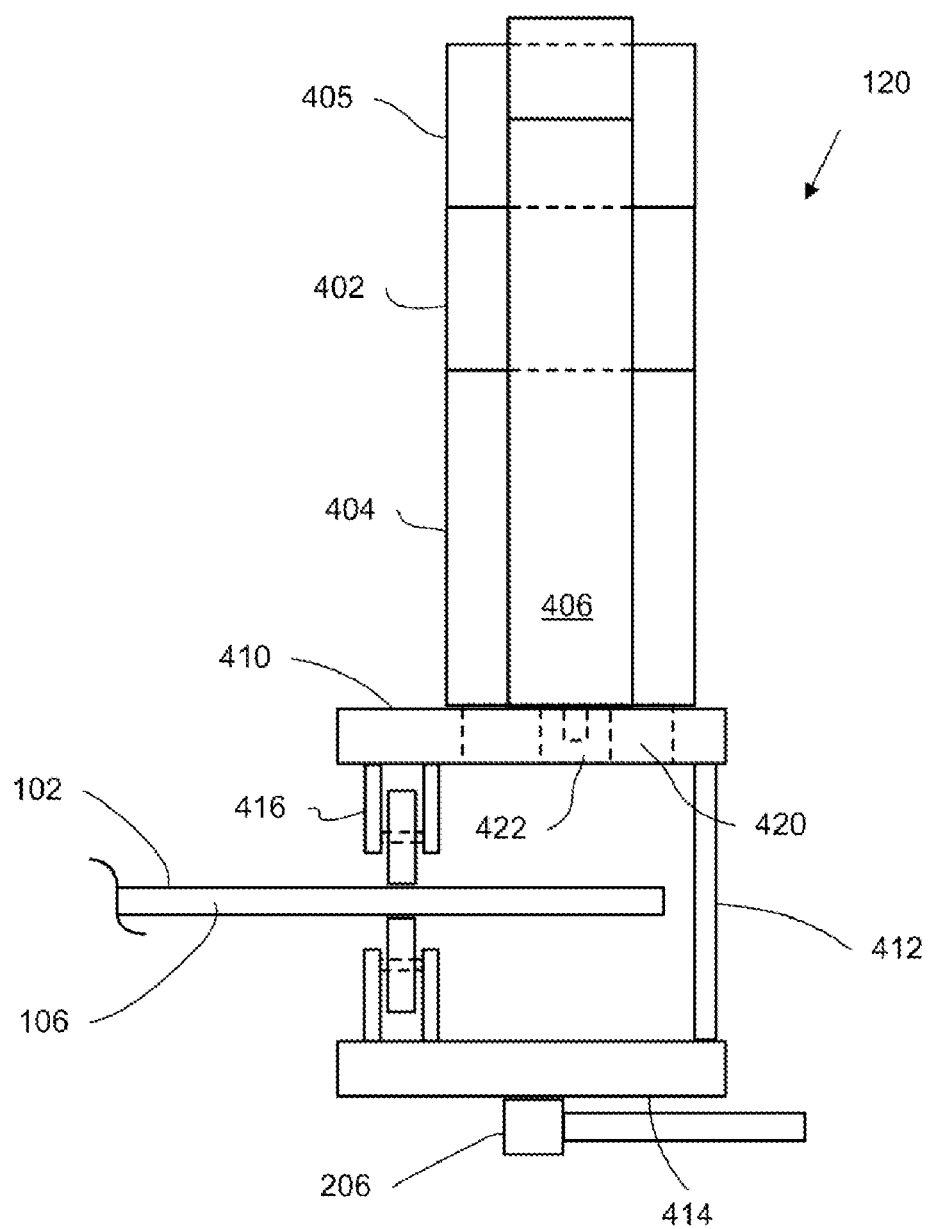
FIG. 4B is an illustrative bottom view of the sensor assembly of FIG. 4A.

Referring to FIGS. 4A and 4B, in one embodiment, illustrative side and bottom views of the sensor assembly 120 used for measuring the motion/position of the flexible shade material 102 are shown. The sensor assembly 120 includes a sensor unit 402. The sensor unit 402 includes an image acquisition section (i.e., the sensor itself), which captures image frames, and a digital signal processor (DSP), which interprets and processes the captured image frames and determines the motion (i.e., shade position displacement ($\Delta Y$)) of the flexible shade material 102. The sensor assembly 120 further includes a lens 404, which focuses the surface of the flexible shade material 102 on the sensor 402, a light source 406, which illuminates the surface of the flexible shade material 102, a sensor interface 405, a first plate 410, a second plate 414, and a third plate 412. The first plate 410, second plate 414, and third plate 412 are made of plastic, fiberglass, aluminum, or similar rigid material. The first plate 410 includes lens opening 420 and a light source opening 422. The sensor assembly 120 further includes a plurality of roller assemblies 416. The first plate 410 and the second plate 414 are both coupled to the third plate 412 and face each other.

Figure 4C:
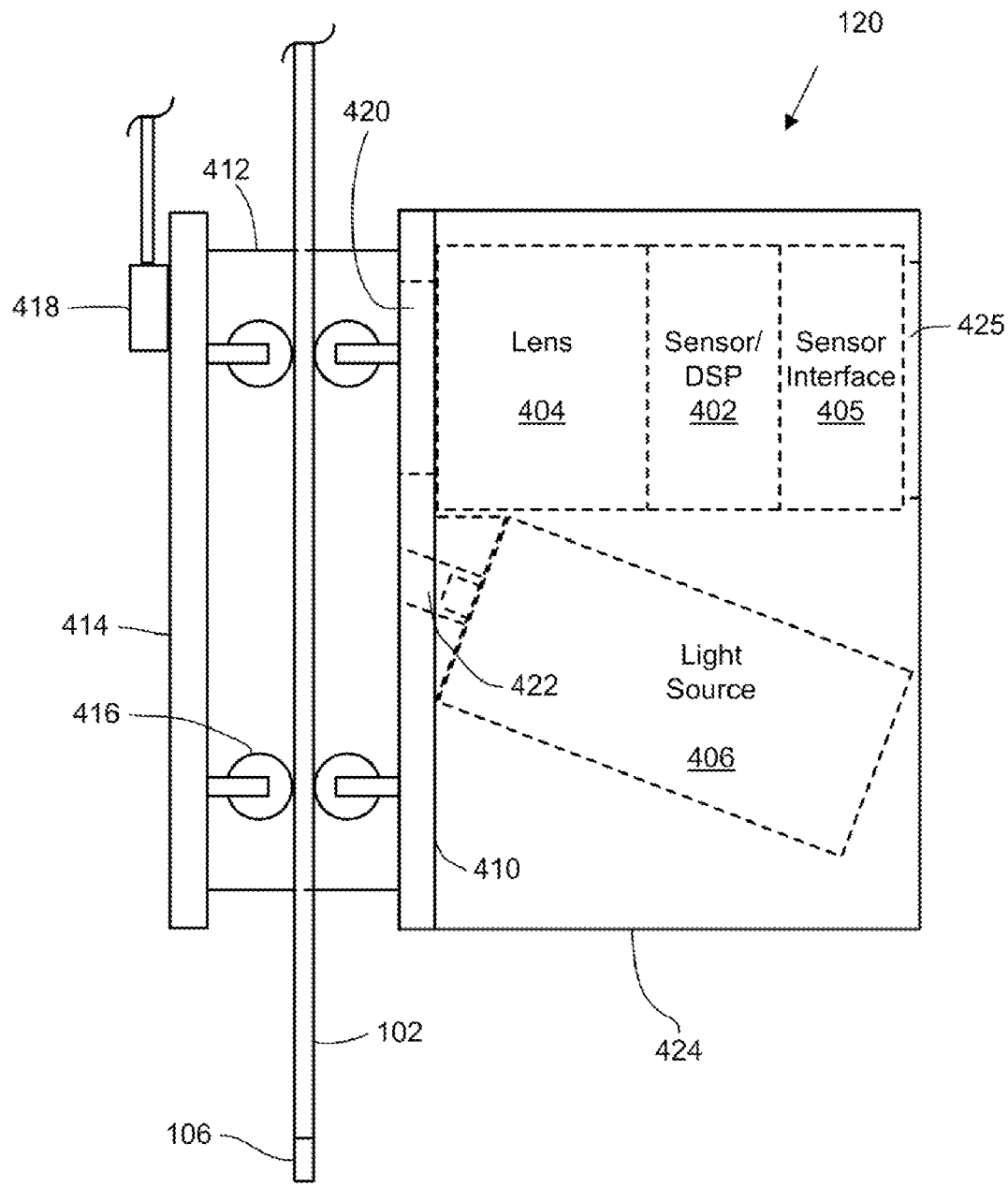
FIG. 4C is an illustrative side view of the sensor assembly of FIG. 4A including a housing, according to one embodiment of the invention.

Referring to FIG. 4C, the sensor assembly 120 also includes a cover or housing 424, which couples to the first plate 410 and covers/encloses the sensor/DSP 402, the lens 404, and the light source 406. The cover 424 is made of plastic, fiberglass, aluminum, or similar rigid material, and includes a sensor interface opening 425, which provides access to the sensor interface 405.

Figure 4D:
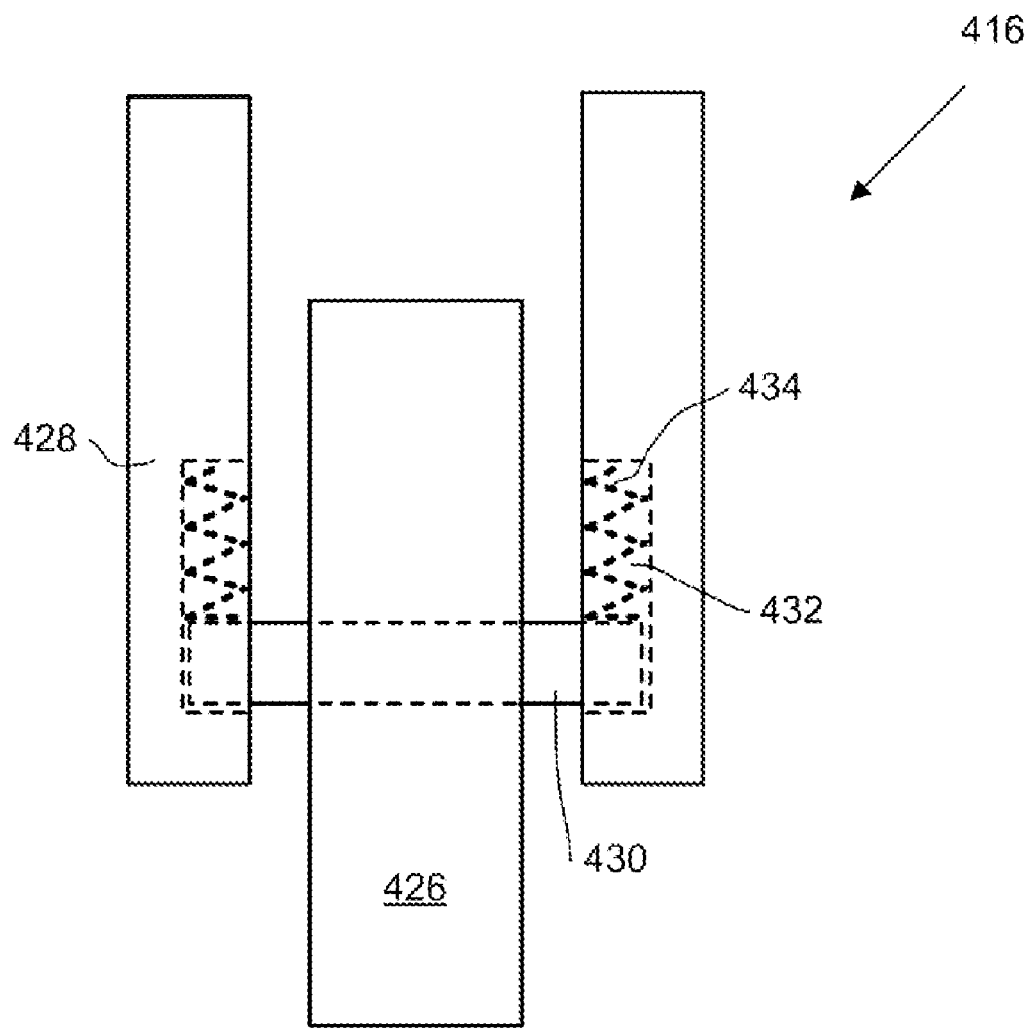
FIG. 4D is an illustrative front view of a roller assembly portion of the sensor assembly of FIG. 4A, according to one embodiment of the invention.

Referring to FIG. 4D, in one embodiment, the roller assembly 416 includes a wheel 426, a wheel axle 430, two struts 428, and two springs 434. The struts 428 each include a channel 432 in which an end of the axle 430 and a spring 434 are disposed. On or more roller assemblies 416 are coupled to the side of each of the first plate 410 and second plate 414 that face each other. Each of the plurality of roller assemblies 416 contacts a surface of the flexible shade material 102, and thereby allows the flexible shade material 102 to easily move/slide between the roller assemblies 416 (and plates 410, 414) at a constant distance from the light source 406 and the lens 404. The springs 434 in the channels 432 allow the wheel 426 to move to accommodate flexible shade materials of varying thickness. The roller assembly 416 is made of plastic, fiberglass, aluminum, or similar rigid material, or any combination thereof.

In various embodiments, a high speed digital camera functions as the sensor 402 and the lens 404, and one or more light emitting diodes or incandescent bulbs function as the light source 406. In preferred embodiments, the sensor 402 is a charged coupled device or a complementary metal oxide semiconductor (CMOS) detector (with a DSP in communication therewith), such as the ADNS-6010 sensor (with DSP) from Avago Technologies. Sensors of this type are capable of capturing frame images of any material that has a discernible pattern or texture. The lens 404 is the ADNS-6120 or ADNS-6130-001 from Avago Technologies. The light source 406 is a vertical cavity surface emitting laser (VCSEL), such as the ADNV-6340 laser diode also from Avago Technologies. In still another embodiment, the sensor 402 is an optical finger navigation sensor.

In operation, the flexible shade material 102 is first placed between the plurality of roller assemblies 416. In this position, the light source 406 illuminates the surface of the flexible shade material 102 that is currently disposed in front of the lens 404. The lens 404 focuses the portion of illuminated flexible shade material 102 onto the sensor 402. As the flexible shade material 102 is rolled or unrolled and thus passes in front of the sensor 402, a plurality of image frames are captured and passed to the DSP. From the plurality of image frames, the DSP determines the direction, i.e., up or down (+/−direction), and the distance $\Delta Y$ in an X-Y plane that the linear portion 112 of the flexible shade material 102 travels. $\Delta X$ should remain zero since the shade does not move left or right. The direction and distance information is passed from the sensor/DSP 402 to the controller 210 via the sensor interface 405. The sensor interface 405 is a communication port that employs one of a serial, I2C, USB, PS/2 communication protocol, or any other similar communication protocol known in the art.

The frame rate of the sensor 402 has to be faster than the standard 50 or 60 Hz frame rate used by televisions. Using such slow frame rates could cause the image detection algorithms to miss large transitions of the shade material and erroneously interpret a subsequent section of shade material as having the same image as a previous section of shade material. Consequently, the image detection algorithms would report false position information that would then cause the calculation of displacement, velocity, or direction to be in error.

To determine the frame rate required for the sensor 402, the density of the recognizable image details would have to be calculated, the field of view of the camera would have to be known, and the fastest linear velocity would have to be measured. The image in successive frames needs to show recognizable details that were present in previous image frames. Since it is not desirable to have to calculate these parameters for each type of shade material, it would be easier and more practical to capture images frames significantly faster than necessary. Capturing images frames faster than necessary would also greatly reduce the false detection of repeating patterns. Thus, in the preferred embodiment, the ADNS-6010 sensor (with DSP) from Avago Technologies, or similar sensor, which has a resolution 800-2000 counts per inch (CPI) is used.

Referring to FIG. 5A, in another embodiment, an illustrative side view of the sensor assembly 122 used for measuring the motion/position of the flexible shade material 102 is shown. The sensor assembly 122 includes a sensor 402, a lens 404, a light source 406, a sensor interface 405, and a plate 502. The plate 502 includes lens opening 506 and a light source opening 508. The sensor assembly 122 further includes a plurality of rollers 504. The rollers 504 can be wheels, cylinders, or balls (e.g., mouse ball). In this embodiment, the sensor assembly 122 is disposed on top of the rolled portion 104 of the flexible shade material 102, as shown in FIGS. 1B, 2B, and 3B.

Figure 5B:
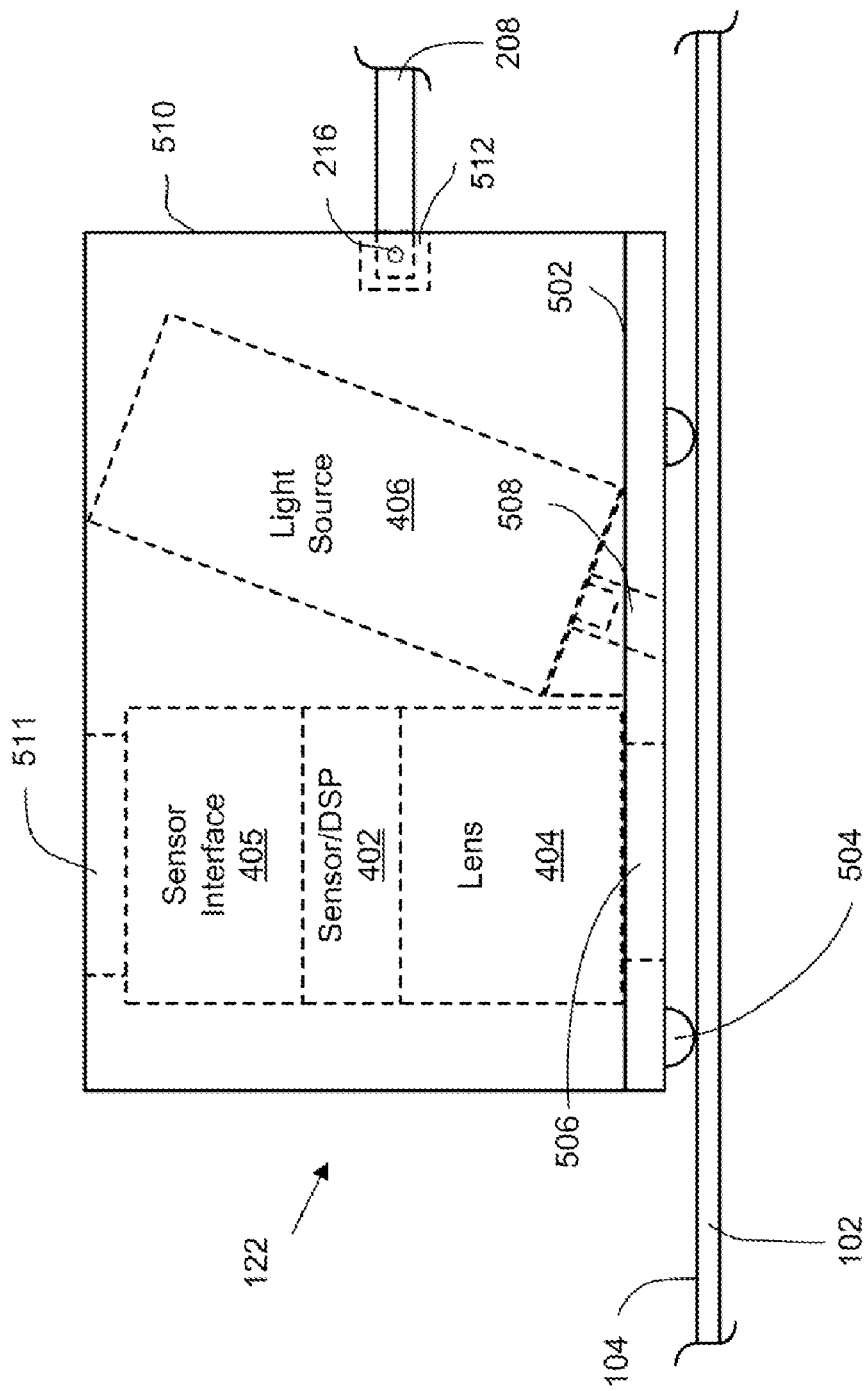
FIG. 5B an illustrative side view of the sensor assembly of FIG. 5A including a housing, according to another embodiment of the invention.

Referring to FIG. 5B, the sensor assembly 122 also includes a cover or housing 510, which couples to the plate 506 and covers/encloses the sensor 402, the lens 404, and the light source 406. The cover 510 includes a sensor interface opening 511, which provides access to the sensor interface 405. The cover 510 also includes a socket 512 in which an end of the bracket 208 and the hinge/pivot pin 216 are coupled.

In operation, the sensor assembly 122 is disposed on top of the rolled portion 104 of the flexible shade material 102 with the rollers 504 contacting the flexible shade material 102. The bracket 208 (FIG. 3B) prevents the sensor assembly 122 from moving in the horizontal plane, while the hinge/pivot pins 214 and 216 (FIG. 3B) allow the sensor assembly 122 to move up or down in the vertical plane as the rolled portion 104 increases or decreases in thickness as the shade 100 is opened (rolled) or closed (unrolled).

In this position, the top most portion of the rolled portion 104 of the flexible shade material 102 lies within the horizontal focal plane of the sensor 402 (i.e., the portion of the flexible shade material 102 lying within the horizontal plane tangent to the rolled portion 104). The portion of flexible shade material 102 in the horizontal focal plane and beneath the sensor 402 is illuminated by the light source 406. The lens 404 focuses this portion of illuminated flexible shade material 102 onto the sensor 402. As the flexible shade material 102 is rolled or unrolled and thus passes in beneath the sensor 402, a plurality of image frames are captured and passed to the DSP. From the plurality of image frames, the DSP determines the direction, i.e., winding-up or unwinding-down (+/−direction), and the distance $\Delta Y$ in an X-Y plane that the linear portion 112 of the flexible shade material 102 travels. $\Delta X$ should remain zero since the shade does not move left or right. The direction and distance information is passed to the controller 210 via the sensor interface 405, as described above.

Figure 6:
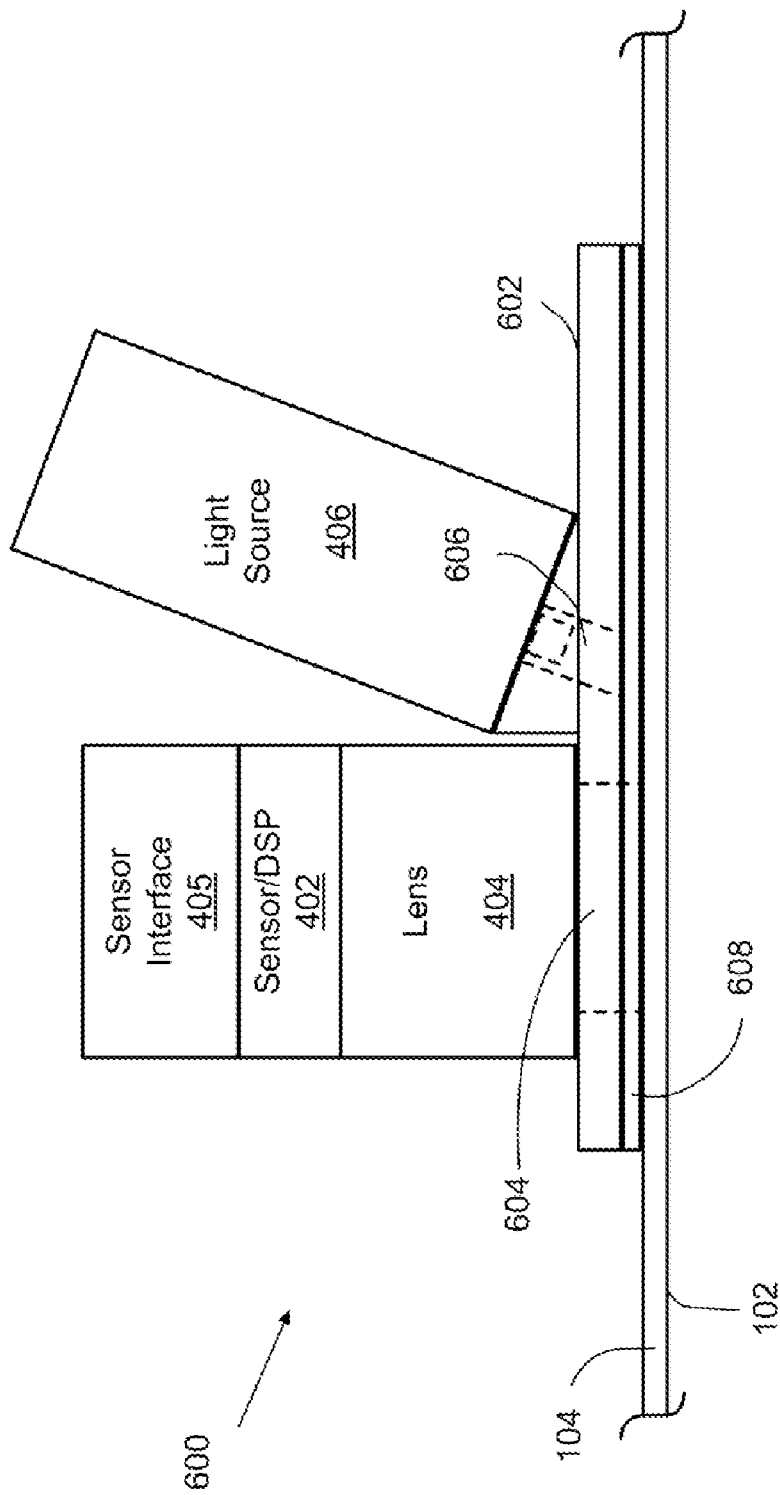
FIG. 6 is an illustrative side view of a sensor assembly used for measuring the linear motion of a roller shade, according to still another embodiment of the invention.

Referring to FIG. 6, in still another embodiment, sensor assembly 600 includes a plate 604 coated with a low friction material 608, such as polytetrafluoroethylene (PTFE), for example. The plate 604 (including the coating 608) includes a lens opening 604 and light source opening 606. In this embodiment, the low friction coating 608 replaces, and provides the same function as, the rollers 504, which is to allow the flexible shade material 102 to move beneath and past the sensor 402 and the light source 406.

In yet other embodiments, the camera or image sensor can be disposed at a fixed position proximate to the rolled portion 104 of the flexible shade material 102. In such an embodiment, the camera or image sensor would have a sufficient depth of focus to capture images over the varying distance between an unrolled shade to a fully rolled shade.

Figure 7:
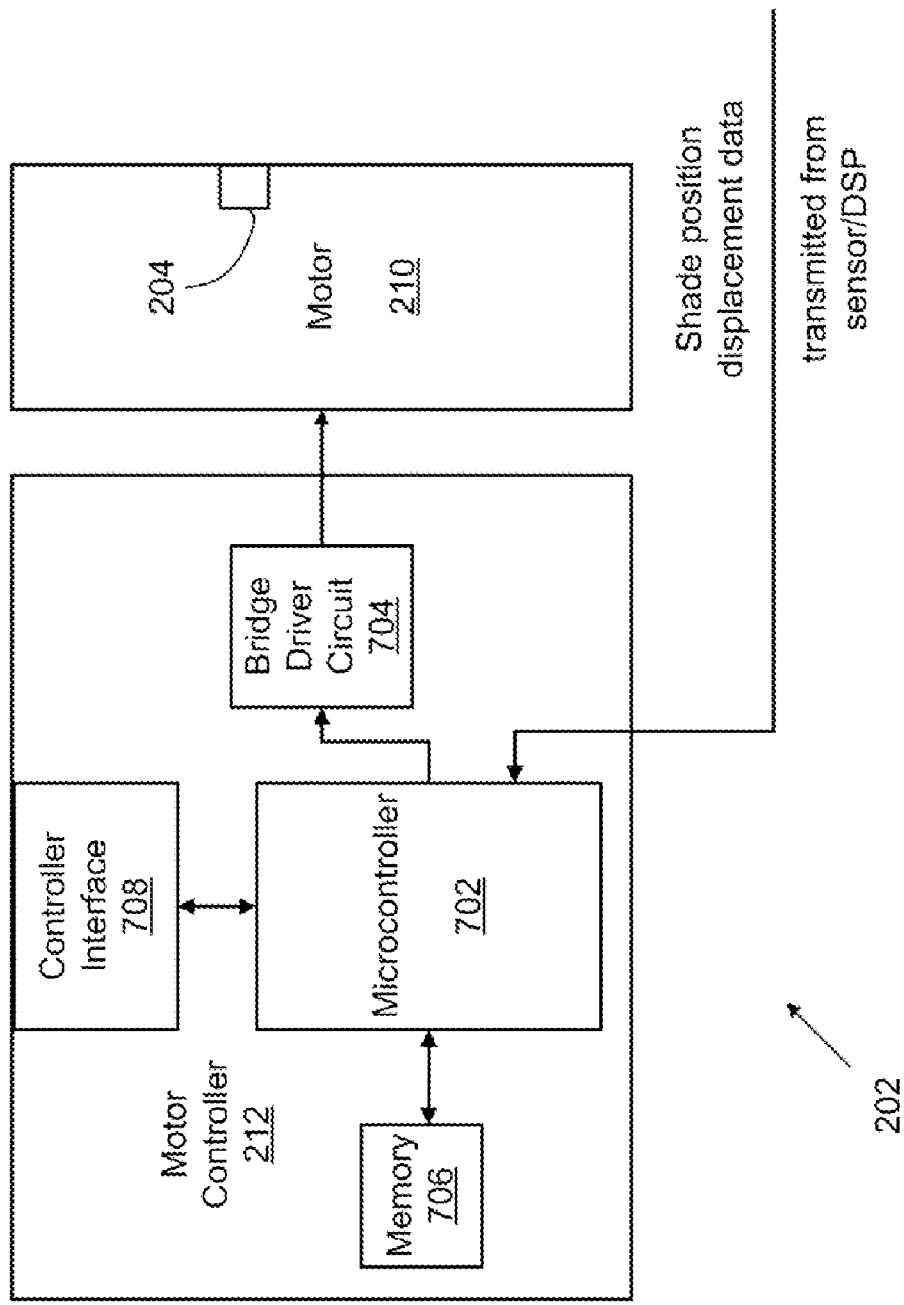
FIG. 7 is an illustrative block diagram of a motor assembly including a motor controller and a motor, according to one embodiment of the invention.

Referring to FIG. 7, in one embodiment, a block diagram of the motor assembly 202 is shown. The motor assembly 202 includes a motor controller 212 and motor 210. The motor controller 212 includes a microcontroller 702, a memory 706 in communication with the microcontroller 702, and a pulse width modulated (PWM) bridge driver circuit 704 in communication with the microcontroller 702. The PWM bridge driver circuit 704 is in communication with, and provides control voltages to, the motor 210. The microcontroller 702 is in communication with, and receives shade position displacement data ($\Delta Y$) from the sensor/DSP 402 via the sensor interface 405. The motor controller 212 further includes a controller interface 708, which allows a user to externally control (e.g., via a touch screen), configure/program, and/or calibrate the motor controller 212 and the sensor assembly 120. The controller interface 708 also allows the motor controller 212 to be controlled by a master controller and synchronized with other shade controllers.

In one embodiment, the memory 706 stores the useful length of the particular shade (i.e., the distance that the lower end 106 of the flexible shade material 102 moves when the shade moves from the fully open position to the fully closed position (or vice versa)). This length is obtained during calibration of the roller shade system, and is described below.

To move the shade to a desired position based on a user's input (or stored program/presets), the microcontroller 702 uses a control system algorithm, such as a critically damped proportional integral derivative (PID) position loop, to determine the instantaneous voltage applied to the motor 210 in order to rotate the roller tube 108 and thus wind or unwind the flexible shade material to move the lower end 106 of the shade to the desired position without overshooting or undershooting the desired position. Inputs to the PID loop include the stored shade length (or positions of the lower end 106 when the shade is fully open and fully closed), and the shade position displacement data ($\Delta Y$), which is received from the sensor/DSP 402 as the flexible shade material 102 is moved.

In other words, the disclosed shade controller only directly measures the linear distance that the shade has moved (i.e., $\Delta Y$), and in response thereto varies the voltage applied to the motor in order to have the linear velocity of the flexible shade material 102 first increase (from zero) based on the distance the shade is to be moved, and then slowly decrease until the linear velocity finally equals zero at the desired position.

Since the diameter of the rolled portion 104 of the flexible shade material 102 varies as the flexible shade material 102 is wound or unwound, the rotational velocity and consequently the linear velocity (velocity of the linear portion 112) vary as the shade moves from the starting position to the desired position. The actual linear velocity of the flexible shade material 102 is calculated by differentiating the shade position displacement data ($\Delta Y$) received from the sensor/DSP 402 over time. Acceleration of the flexible shade material 102 is calculated by differentiating the calculated velocity over time.

In another embodiment, a secondary velocity PID loop is used to converge the actual instantaneous velocity to the desired instantaneous velocity. In still other embodiments, other control system algorithms that include calculations of position, velocity, and acceleration can be utilized to achieve similar performance.

In still another embodiment, the memory 706 also stores the desired maximum time allowed for moving the lower end 106 of the flexible shade material 102 between the shade being fully closed and the shade being fully open (or vice versa), i.e., the shade raise/lower time. For example, if the shade raise/lower time is thirty seconds, the shade must move from a fully closed position to a fully open position (or vice versa) within at most thirty seconds. In this embodiment, a separate time PID loop (executed by the microcontroller 702) is used to ensure that the shade moves from a start position to a desired position (which is achieved using the first (position) PID loop described above) within the shade raise/lower time. The actual time taken to move the shade from a start position to an end position (e.g., from 50 percent open to 75 percent open) depends on the actual distance the shade must move, but is never longer than the shade raise/lower time.

Using the position PID loop alone to move the flexible shade material 102 from a starting position to a desired position may result in the shade being abruptly and rapidly accelerated from the starting position such that the motion of the shade appears "jerky" or jarring. In order to prevent such a jarring acceleration, in other embodiments, another algorithm is implemented in the microcontroller 702 to slowly increase (or ramp up) the linear velocity of the flexible shade material 102. Such algorithms include, but are not limited to, exponential functions, ramp functions, and Gaussian functions. This feature enables the shade to start moving with a slow, smooth, and non-jarring motion, and thus reduces noise and vibrations caused by the sudden acceleration of the motor 210 and the flexible shade material 102. Further, such a slow and smooth starting motion is more aesthetically pleasing than an abrupt jump to a constant linear shade velocity.

Referring to FIGS. 8A-8F, one embodiment of the roller shade system of the present invention disposed in a window 802 is shown. In particular, FIGS. 8A-8F show the lower end 106 of the linear portion 112 of the flexible shade material 102 at six different vertical positions, respectively.

Figure 9:
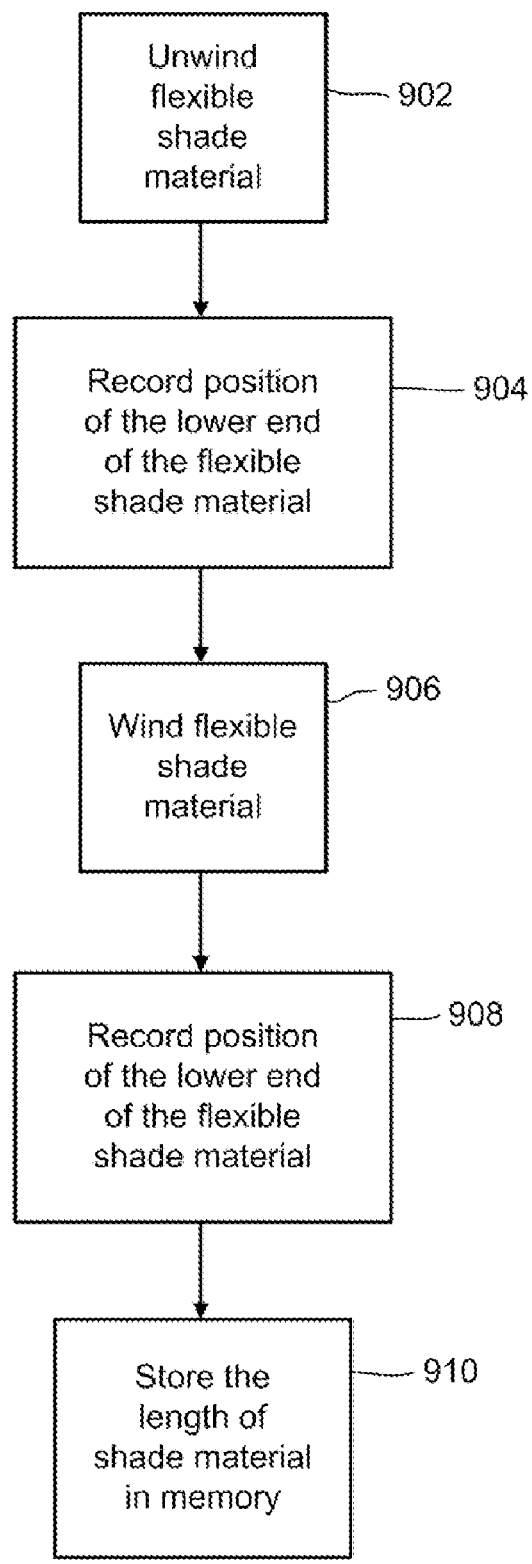
FIG. 9 is an illustrative flow diagram of the steps for calibrating the roller shade system, according to one embodiment of the invention.
Figure 10A:
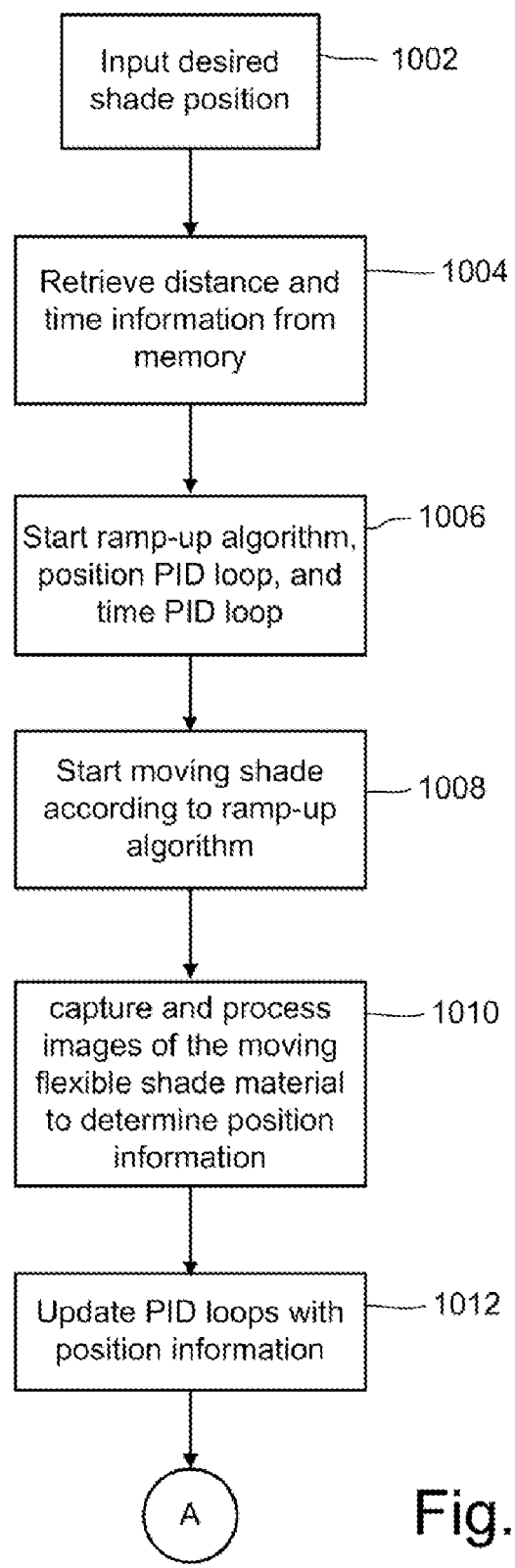
FIGS. 10A-10B are illustrative flow diagrams of the steps for moving the roller shade from a fully closed position to a fully open position, according to one embodiment of the invention.
Figure 10B:
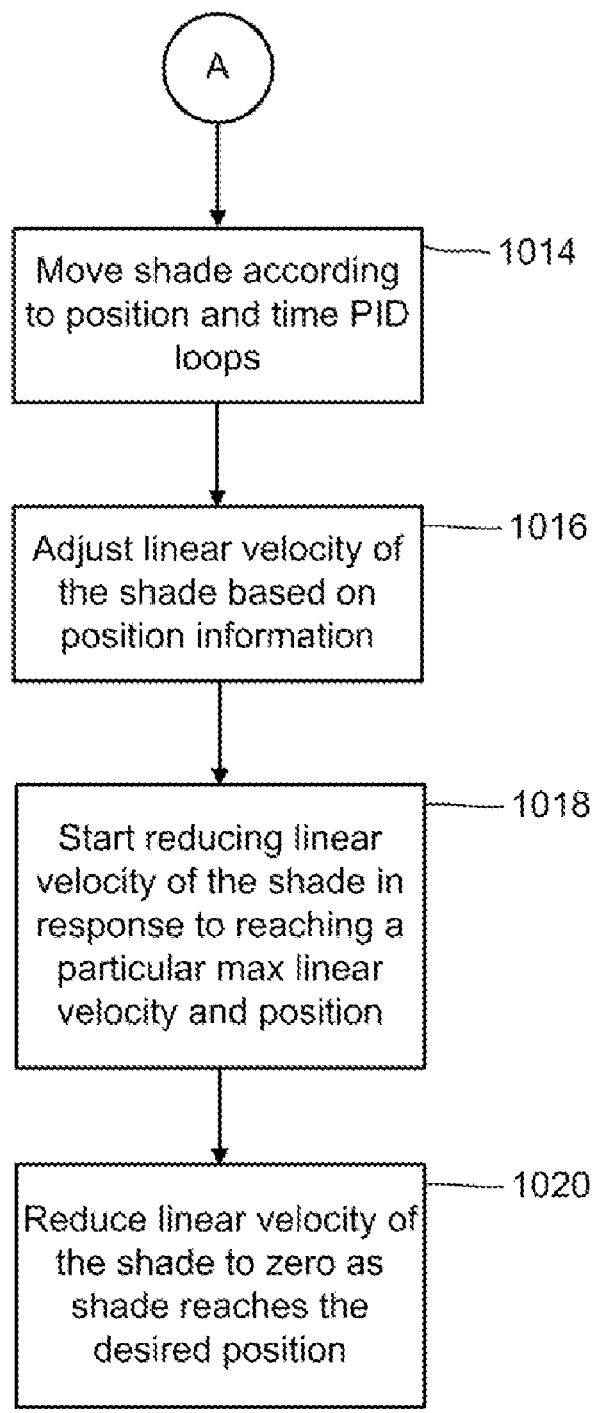

Referring to FIG. 9, in one embodiment, once the roller shade system has been installed/mounted in the window 802, the roller shade system must be calibrated. To calibrate the roller shade system, the flexible shade material 102 is unwound from the roller tube 108 so that the lower end 106 of the linear portion 112 of the flexible shade material 102 is positioned at the bottom of the window 802 (Step 902), as shown in FIG. 8A. This shade position (i.e., shade fully closed) is the starting position and recorded by the sensor 402 and processed by the DSP as position zero ("0,0" in an X-Y coordinate system) (Step 904).

Next, the flexible shade material 102 is wound onto the roller tube 108 so that the lower end 106 of the linear portion 112 of the flexible shade material 102 is positioned at the top of the window 802 (Step 906), as shown in FIG. 8F. This shade position is the ending position (shade fully open) and recorded by the sensor 402 and processed by the DSP as position L (Step 908) ("0,L" in an X-Y coordinate system), where L is length of the linear portion 112 of the flexible shade material 102 that covers the window 802. In other words, the length of flexible shade material 102 that moves past the sensor when the shade is moved from a fully closed position to a fully open position (or vice versa) is $\Delta Y = L$.

The value L is stored in the memory 706 of the motor controller 212 (Step 910). As mentioned above, in some embodiments, also stored in the memory 706 is the shade raise/lower time, which is the desired maximum time for raising the lower end 106 of the flexible shade material 102 from position zero (shade fully closed) to position L (shade fully open).

After the roller shade system has been calibrated, a user can then operate the system to move the shade to any desired position between and including fully open and fully closed. To operate the disclosed shade system, a user need only input a desired shade position into a user interface, such as a touch screen, that is in communication (wired or wireless) with the motor controller 212. For example, the user can select "fully open", "fully closed", some percentage of fully open (e.g., 35 percent), or one of a plurality preset position settings (e.g., an exact position that blocks the sun at a particular time of day).

Referring to FIGS. 8A-8F and FIGS. 10A-10B, assume, for example, that the total length of the flexible shade material 102 that completely covers a window is forty inches long and that the maximum desired time to raise (or lower) the lower end 106 of flexible shade material 102 from the fully closed (or fully open) position is ten seconds. Next assume that the shade is fully closed (position zero), as shown in FIG. 8A, and that a user chooses to raise/move the shade to a fully open position (i.e., position L=40 inches), as shown in FIG. 8F. Additionally, since the roller shade system has been previously calibrated, the microcontroller 702 knows the current position of the lower end 106 of the flexible shade material 102 (i.e., fully closed, position zero (start position)).

After the user inputs the command to fully open the shade (Step 1002), the microcontroller 702 retrieves from memory 706 the distance to move the shade (e.g., 40 inches to the fully open position) and the maximum time to move the shade that distance (e.g., 10 seconds) (Step 1004). The microcontroller 702 then starts executing various control algorithms including the ramp up algorithm to ensure the shade starts moving slowly and smoothly, the position PID loop to ensure that the linear shade velocity is zero at position L (i.e., the fully open position), and the time PID loop to ensure that the lower end 106 of the flexible shade material 102 moves to position L (40 inches) within ten seconds (Step 1006).

Referring the FIG. 8B, at the start of the shade motion, the microcontroller 702 uses the ramp-up algorithm to determine the particular voltage applied to the motor 210 so that the lower end 106 of the flexible shade material 102 starts moving (raising) slowly and gradually picks up speed, rather than abruptly jumping to some maximum speed (Step 1008). As the lower end 106 starts moving, the sensor/DSP 402 captures and processes images of the moving flexible shade material 102 (Step 1010) and reports this motion (position displacement $\Delta Y$) to the microcontroller 702, which, in turn updates the various PID loops (Step 1012).

Referring to FIG. 8C, when the lower end 106 reaches a particular linear velocity and position, the position and time PID loops take over from the ramp-up algorithm (Step 1014). The particular linear velocity and position at which the position and time PID loops take over from the ramp-up algorithm are determined by the position and time PID loops based on the final position to be reached and the time to reach that final position. The microcontroller 702 continuously makes corrections to the voltage applied to the motor 210 (and consequently to the rotational and linear velocities) based on the position information received from the sensor/DSP 402 in view of the final position to be reached and the time to reach that final position (Step 1016).

Referring to FIG. 8D, when the lower end 106 reaches another particular linear velocity (e.g., a maximum linear velocity) and position (e.g., half open), the position and time PID loops determine that the lower end 106 needs to start slowing down in order to have a zero velocity at position L within the raise/lower time (Step 1018). As mentioned above, this process will prevent the lower end 106 from undershooting or overshooting the desired position L.

Referring to FIG. 8E, as the lower end 106 approaches the desired end position, the microcontroller 702 continues to adjust the voltage to the motor 210 (via position and time PID loops) to further slow down the lower end 106. Finally, as the lower end 106 reaches the position L, the linear velocity of the lower end 106 reaches zero (Step 1020), as shown in FIG. 8F. The new position (i.e., position L) of the lower end is then stored in the memory 706. This position is now the current shade position and consequently the start position relative to the next desired end position.

The above-described process would be the same for moving the shade from any start position to any desired end position. As described above, the last end position of the shade (i.e., after a previous move or after initial calibration)

becomes the new start position relative to a new desired end position. After the user inputs the new shade end position, the shade starts moving under the control of a ramp-up algorithm. Then, after reaching a particular linear velocity and position, the shade continues moving under control of a position PID loop and optionally also under control of a time PID loop until the shade reaches the next desired end position. For example, if the start position of the shade was 50% open and the desired end position of the shade was 75% open, the shade would move as described above between the 50% open position and the 75% open position.

Although it is intended that the sensor detect shade motion in one dimension in an X-Y plane, the optical sensors described herein are capable of detecting motion in two dimensions in an X-Y plane. In the event that the sensor is, or becomes, misaligned with the shade material motion in one dimension, such that motion of the shade material in both the X and Y planes is erroneously detected, Pythagorean's equation can be used to correct for the sensor misalignment and determine the actual motion of the shade.

Benefits of the disclosed optical shade controller system include being able to measure and control the motion of a roller shade without having to modify the shade material in any way. Further, because a dedicated light source is included in the sensor assembly, the shade can be controlled under any light conditions. Additionally, since the sensor is capable of capturing frame images of any material/fabric that has a discernible pattern or texture, any shade material with such a pattern or texture can be used.

LIST OF ACRONYMS USED IN THE DETAILED DESCRIPTION OF THE INVENTION

The following is a list of the acronyms used in the specification in alphabetical order.
CCD charge coupled device
CMOS complementary metal oxide semiconductor
PID proportional integral derivative
PTFE polytetrafluoroethylene
PWM pulse width modulation
RPM rotations per minute
VCSEL vertical cavity surface emitting laser Alternate Embodiments Alternate embodiments may be devised without departing from the spirit or the scope of the invention.

What is claimed is:

1. A method for controlling a roller shade having a rotatably supported roller tube windingly receiving a flexible shade material, the method comprising:
providing a reversible motor that operably engages the roller tube to rotate the roller tube to move a lower end of the flexible shade material between a first position and a second position;
capturing, with an optical sensor, an image frame of the flexible shade material at a plurality of linear positions along the flexible shade material as the lower end of the flexible shade material moves from the first position to the second position; and
controlling the reversible motor to move the lower end of the flexible shade material from the first position to the second position in response to position information obtained from the plurality of captured image frames.

2. The method of claim 1, further comprising processing the plurality of captured image frames with a digital signal processor to determine the position information comprising changes in position of the flexible shade material as the lower end of the flexible shade material moves from the first position to the second position.

3. The method of claim 1, further comprising controlling the reversible motor to move the lower end of the flexible shade material from the first position to the second position in a predetermined amount of time.

4. The method of claim 1, further comprising controlling the reversible motor to move the lower end of the flexible shade material from the first position to the second position using a proportional integral derivative (PID) loop.

5. The method of claim 1, further comprising controlling the reversible motor to move the lower end of the flexible shade material from the first position to the second position at a variable linear velocity.

6. The method of claim 5, wherein the variable linear velocity varies according to one of an exponential function, a ramp function, or a Gaussian function.

7. The method of claim 1, further comprising illuminating the flexible shade material moving past the optical sensor with a light source.

8. The method of claim 7, wherein the light source comprises one of an incandescent light, a light emitting diode, or a vertical cavity surface emitting laser.

9. The method of claim 1, wherein the optical sensor comprises one of a high speed digital camera, a charge coupled device, or a complementary metal oxide semiconductor detector.

10. The method of claim 1, further comprising storing in a memory the positions of the lower end of the flexible shade material when the roller shade is fully open and when the roller shade is fully closed.

11. A method for controlling a roller shade having a rotatably supported roller tube windingly receiving a flexible shade material, the method comprising:
providing a reversible motor that operably engages the roller tube to rotate the roller tube to move a lower end of the flexible shade material between a first position and a second position;
capturing, with an optical sensor, an image frame of the flexible shade material at a plurality of linear positions along the flexible shade material as the lower end of the flexible shade material moves from the first position to the second position; and
controlling the reversible motor to move the lower end of the flexible shade material from the first position to the second position using a proportional integral derivative (PID) loop at a variable linear velocity.

12. The method of claim 11, further comprising processing the plurality of captured images frames with a digital signal processor to determine changes in position of the flexible shade material as the lower end of the flexible shade material moves from the first position to the second position.

13. The method of claim 12, further comprising controlling the reversible motor to move the lower end of the flexible shade material from the first position to the second position in response to the changes in position of the flexible shade material.

14. The method of claim 11, further comprising controlling the reversible motor to move the lower end of the flexible shade material from the first position to the second position in a predetermined amount of time.

15. The method of claim 11, wherein the variable linear velocity varies according to one of an exponential function, a ramp function, or a Gaussian function.

16. The method of claim 11, further comprising illuminating the flexible shade material moving past the optical sensor with a light source.

17. The method of claim 16, wherein the light source comprises one of an incandescent light, a light emitting diode, or a vertical cavity surface emitting laser, and the optical sensor comprises one of a high speed digital camera, a charge coupled device, or a complementary metal oxide semiconductor detector.

18. The method of claim 11, further comprising storing in a memory the positions of the lower end of the flexible shade material when the roller shade is fully open and when the roller shade is fully closed.

19. A method for controlling a roller shade having a rotatably supported roller tube windingly receiving a flexible shade material, the method comprising:

providing a reversible motor that operably engages the roller tube to rotate the roller tube to move a lower end of the flexible shade material between a first position and a second position;

capturing, with an optical sensor, an image frame of the flexible shade material at a plurality of linear positions along the flexible shade material as the lower end of the flexible shade material moves from the first position to the second position; and controlling the reversible motor to move the lower end of the flexible shade material from the first position to the second position in response to position information obtained from the plurality of captured image frames at a variable linear velocity.

* * * * *